(12) United States Patent
Snell et al.

(10) Patent No.: US 10,544,373 B2
(45) Date of Patent: Jan. 28, 2020

(54) PROCESS FOR SELECTIVELY ALLOCATING HEATING DUTY IN A CATALYTIC REFORMING SYSTEM

(71) Applicant: Chevron Phillips Chemical Company LP, The Woodlands, TX (US)

(72) Inventors: Ryan W. Snell, Jubail Industrial (SA); Vince D. McGahee, Kemah, TX (US); Scott G. Morrison, Kingwood, TX (US); Kenny A. Fountain, Biloxi, MS (US); Cameron M. Crager, Mobile, AL (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 232 days.

(21) Appl. No.: 15/807,287

(22) Filed: Nov. 8, 2017

(65) Prior Publication Data
US 2019/0136143 A1    May 9, 2019

(51) Int. Cl.
*C10G 61/04*        (2006.01)
*B01D 3/00*         (2006.01)
(Continued)

(52) U.S. Cl.
CPC .............. *C10G 61/04* (2013.01); *B01D 3/007* (2013.01); *B01D 3/40* (2013.01); *C10G 33/04* (2013.01);
(Continued)

(58) Field of Classification Search
CPC ........ C10G 61/04; C10G 35/04; C10G 33/04; C10G 2300/1096; C10G 2300/20; B01D 3/40; B01D 3/007
See application file for complete search history.

(56) References Cited

U.S. PATENT DOCUMENTS

| 2,439,934 A | 4/1948 | Johnson et al. |
| 3,254,023 A | 5/1966 | Miale et al. |
(Continued)

OTHER PUBLICATIONS

Song et al (An overview of new approaches to deep desulfurization for ultra-clean gasoline, diesel and jet fuel, 2003, Catalysis Today vol. 86, 211-263 (Year: 2003).*

(Continued)

*Primary Examiner* — Randy Boyer
*Assistant Examiner* — Juan C Valencia
(74) *Attorney, Agent, or Firm* — Conley Rose, P.C.

(57) ABSTRACT

A process for a catalytic reforming system, the process comprising controlling an amount of aromatic hydrocarbon fed to a sulfur removal system in the catalytic reforming system such that a temperature of a reduced sulfur stream flowing from the sulfur removal system is higher than a temperature of a stream which is fed to the sulfur removal system, due to a heat of reaction generated in the sulfur removal system by converting at least a portion of the aromatic hydrocarbon to aliphatic hydrocarbons. A process for a catalytic reforming system, the process comprising feeding an effective amount of aromatic hydrocarbons to a sulfur removal system of the catalytic reforming system such that a heat duty of a first furnace of a plurality of reactor-furnace pairs connected in series in the catalytic reforming system is reduced relative to operation of the sulfur removal system without the effective amount of aromatic hydrocarbons.

17 Claims, 5 Drawing Sheets

(51) Int. Cl.
  *C10G 33/04* (2006.01)
  *B01D 3/40* (2006.01)
  *C10G 35/04* (2006.01)

(52) U.S. Cl.
  CPC ..... *C10G 35/04* (2013.01); *C10G 2300/1096* (2013.01); *C10G 2300/202* (2013.01)

(56) References Cited

U.S. PATENT DOCUMENTS

| | | |
|---|---|---|
| 4,132,530 A | 1/1979 | Schwimmer |
| 5,401,386 A | 3/1995 | Morrison et al. |
| 5,877,367 A | 3/1999 | Witte |
| 6,004,452 A | 12/1999 | Ash et al. |
| 6,159,358 A | 12/2000 | Mulvaney, III et al. |
| 6,274,101 B1 | 8/2001 | Sechrist |
| 6,812,180 B2 | 11/2004 | Fukunaga |
| 7,153,801 B2 | 12/2006 | Wu |
| 8,900,442 B2 | 12/2014 | Sadler et al. |
| 9,085,736 B2 | 7/2015 | Morrison et al. |
| 2002/0008049 A1* | 1/2002 | Inomata ............. C10G 65/04 208/57 |
| 2006/0213811 A1* | 9/2006 | Clay ............. B01J 8/12 208/137 |

OTHER PUBLICATIONS

Dhandapani, B., et al., "Simultaneous hydrodesulfurization, hydrodeoxygenation, and hydrogenation with molybdenum carbide," Mar. 27, 1998, vol. 168, Issue 2, pp. 219-228, Elsevier Science B.V.

\* cited by examiner

PROCESS FOR SELECTIVELY ALLOCATING HEATING DUTY IN A CATALYTIC REFORMING SYSTEM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present disclosure generally relates to the production of aromatic hydrocarbons. More specifically, this disclosure relates to a catalytic reforming process for benzene production.

BACKGROUND

The catalytic conversion of aliphatic hydrocarbons into aromatic compounds, referred to as aromatization or reforming, is an important industrial process. The aromatization reactions can include dehydrogenation, isomerization, and hydrocracking of the aliphatic hydrocarbons, each of which produces specific aromatic compounds. Aromatization reactions are intended to convert aliphatic hydrocarbons, such as paraffins, cycloparaffins, naphthenes, and olefins, to aromatics and hydrogen. Generally, aromatization processes are endothermic, and the necessary heat input affects the economics of the reforming process.

A variety of catalysts can be used to carry out the reforming reaction, all of which are subject to deactivation over time. For example, catalyst deactivation can result from poisoning, carbon deposit formation, or other similar processes. The reforming process can include a variety of process units to remove catalyst poisons. For example, a reforming process can include a sulfur removal system to remove sulfur from the hydrocarbon stream feed to the reactors. By removing the sulfur from the hydrocarbon prior to contacting the hydrocarbon with the catalyst, the catalyst life can be extended. However, sulfur removal systems can also require heat input, which further impacts the economics of the reforming process. Thus, there is an ongoing need for managing heat duty across catalytic reforming systems to improve the overall energy efficiency of catalytic reforming systems.

SUMMARY

Disclosed herein is a process for a catalytic reforming system, the process comprising combining, upstream of a sulfur removal system in the catalytic reforming system, a first stream comprising an aromatic hydrocarbon with a second stream to form a combined stream comprising the aromatic hydrocarbon, and feeding the aromatic hydrocarbon to the sulfur removal system, wherein the aromatic hydrocarbon which is fed to the sulfur removal system is contained in or obtained from the combined stream.

Further disclosed herein is a process for a catalytic reforming system, the process comprising combining a hydrocarbon feed stream comprising a sulfur-containing compound, a first aliphatic hydrocarbon, and water with an aromatic-containing stream comprising an aromatic hydrocarbon to form an aromatized hydrocarbon feed stream comprising the sulfur-containing compound, the first aliphatic hydrocarbon, water, and the aromatic hydrocarbon, feeding the aromatized hydrocarbon feed stream to a drier to separate the water and form a dried hydrocarbon feed stream comprising the sulfur-containing compound, the first aliphatic hydrocarbon, and the aromatic hydrocarbon, heating the sulfur-containing compound, the first aliphatic hydrocarbon, and the aromatic hydrocarbon in a first feed stream heat exchanger to form a heated stream comprising the sulfur-containing compound, the first aliphatic hydrocarbon, and the aromatic hydrocarbon, feeding the heated stream to a sulfur removal system, converting the aromatic hydrocarbon to a second aliphatic hydrocarbon and removing the sulfur-containing compound in the sulfur removal system to form a reduced sulfur stream comprising the first aliphatic hydrocarbon and the second aliphatic hydrocarbon, feeding the reduced sulfur stream to a second feed stream heat exchanger, heating the first aliphatic hydrocarbon and the second aliphatic hydrocarbon in the second feed stream heat exchanger to form a catalytic reforming reactor feed stream comprising the first aliphatic hydrocarbon and the second aliphatic hydrocarbon, and feeding the catalytic reforming reactor feed stream to a first pair of a plurality of reactor-furnace pairs.

Also disclosed herein is a process for a catalytic reforming system, the process comprising combining an effluent stream of a first compressor of a plurality of compressors in a recycle gas section of the catalytic reforming system with a recycle gas stream comprising hydrogen separated from liquid hydrocarbons in the recycle gas section of the catalytic reforming system to form an aromatized recycle stream, wherein the effluent stream comprises an aromatic hydrocarbon, wherein the aromatized recycle stream comprises the aromatic hydrocarbon and hydrogen, combining the aromatized recycle stream with a dried hydrocarbon feed stream comprising a sulfur-containing compound and a first aliphatic hydrocarbon to form an aromatized hydrocarbon feed stream comprising the sulfur-containing compound, the first aliphatic hydrocarbon, the aromatic hydrocarbon, and hydrogen, feeding the aromatized hydrocarbon feed stream to a first feed stream heat exchanger, heating the sulfur-containing compound, the first aliphatic hydrocarbon, the aromatic hydrocarbon, and hydrogen in the first feed stream heat exchanger to form a heated stream comprising the sulfur-containing compound, the first aliphatic hydrocarbon, the aromatic hydrocarbon, and hydrogen, feeding the heated stream to a sulfur removal system, converting the aromatic hydrocarbon to a second aliphatic hydrocarbon and removing the sulfur-containing compound in the sulfur removal system to form a reduced sulfur stream comprising the first aliphatic hydrocarbon and the second aliphatic hydrocarbon, feeding the reduced sulfur stream to a second feed stream heat exchanger, heating the first aliphatic hydrocarbon and the second aliphatic hydrocarbon in the second feed stream heat exchanger to form a catalytic reforming reactor feed stream comprising the first aliphatic hydrocarbon and the second aliphatic hydrocarbon, and feeding the catalytic reforming reactor feed stream to a first pair of a plurality of reactor-furnace pairs.

Also disclosed herein is a process for a catalytic reforming system, the process comprising recovering a heated stream comprising a sulfur-containing compound and a first aliphatic hydrocarbon from a first feed stream heat exchanger, combining an effluent stream of a first compressor of a plurality of compressors in a recycle gas section of the catalytic reforming system with the heated stream to form an aromatized hydrocarbon feed stream, wherein the effluent stream comprises an aromatic hydrocarbon, wherein the aromatized hydrocarbon feed stream comprises the sulfur-containing compound, the first aliphatic hydrocarbon, and the aromatic hydrocarbon, feeding the aromatized hydrocarbon feed stream to a sulfur removal system, converting the aromatic hydrocarbon to a second aliphatic hydrocarbon and removing the sulfur-containing compound in the sulfur removal system to form a reduced sulfur stream comprising the first aliphatic hydrocarbon and the second aliphatic hydrocarbon, feeding the reduced sulfur stream to a second feed stream heat exchanger, heating the first aliphatic hydrocarbon and the second aliphatic hydrocarbon in the second feed stream heat exchanger to form a catalytic reforming reactor feed stream comprising the first aliphatic hydrocarbon and the second aliphatic hydrocarbon, and feeding the catalytic reforming reactor feed stream to a first pair of a plurality of reactor-furnace pairs.

BRIEF DESCRIPTION OF THE DRAWINGS

The detailed description will reference the drawings briefly described below, wherein like reference numerals represent like parts, unless otherwise indicated.

DETAILED DESCRIPTION

Disclosed herein are systems, apparatuses, and processes related to petrochemical production processes, for example the production of aromatic compounds, such as benzene. The systems, apparatuses, and processes are generally related to the carrying out a reforming process in a catalytic reforming system while allowing for the removal of catalyst poisons, such as sulfur, from a catalytic reforming reactor feed stream, wherein the process can comprise redistributing heat duty across the catalytic reforming system.

As disclosed herein, a process for a catalytic reforming system can generally comprise the steps of (i) combining, upstream of a sulfur removal system in the catalytic reforming system, a first stream comprising an aromatic hydrocarbon with a second stream to form a combined stream comprising the aromatic hydrocarbon; and (ii) feeding the aromatic hydrocarbon to the sulfur removal system, wherein the aromatic hydrocarbon which is fed to the sulfur removal system is contained in or obtained from the combined stream. The process can further comprise (iii) converting by exothermic reaction the aromatic hydrocarbon to an aliphatic hydrocarbon in the sulfur removal system.

Figure 2:
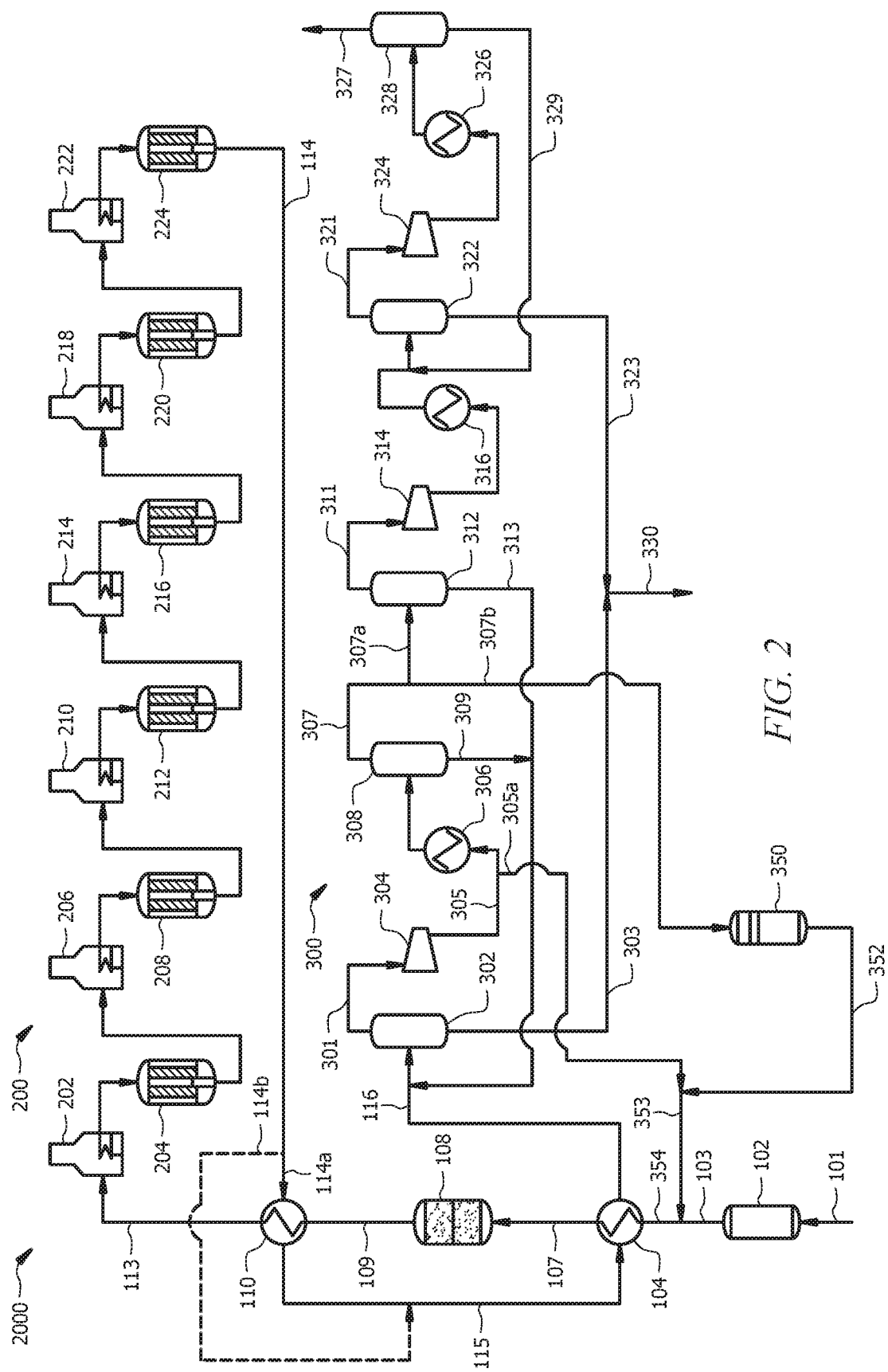
FIG. 2 illustrates a schematic of a catalytic reforming system 2000.

In some aspects, for example as illustrated in the configuration of FIG. 2, and as will be described in more detail later herein, a temperature of the first stream can be higher than a temperature of the second stream. In such aspects, the temperature of the first stream is from about 300° F. (about 149° C.) to about 400° F. (about 204° C.); and the temperature of the second stream is from about 41° F. (about 5° C.) to about 212° F. (about 100° C.).

The following definitions are provided in order to aid those skilled in the art in understanding the detailed description of the present invention. Unless otherwise defined herein, scientific and technical terms used in connection with the present invention shall have the meanings that are commonly understood by those of ordinary skill in the art to which this invention belongs. Further, unless otherwise required by context, singular terms shall include pluralities and plural terms shall include the singular.

Unless explicitly stated otherwise in defined circumstances, all percentages, parts, ratios, and like amounts used herein are defined by weight.

Further, certain features of the present invention which are, for clarity, described herein in the context of separate embodiments, may also be provided in combination in a single embodiment. Conversely, various features of the invention that are, for brevity, described in the context of a single embodiment, may also be provided separately or in any sub-combination.

If a term is used in this disclosure but is not specifically defined herein, the definition from the IUPAC Compendium of Chemical Terminology, 2nd Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Regarding claim transitional terms or phrases, the transitional term "comprising," which is synonymous with "including," "containing," "having," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps and those that do not materially affect the basic and novel characteristic(s) of the claim. A "consisting essentially of" claim occupies a middle ground between closed claims that are written in a "consisting of" format and fully open claims that are drafted in a "comprising" format. Absent an indication to the contrary, describing a compound or composition as "consisting essentially of" is not to be construed as "comprising," but is intended to describe the recited component that includes materials which do not significantly alter the composition or method to which the term is applied. For example, a feedstock consisting essentially of a material A can include impurities typically present in a commercially produced or commercially available sample of the recited compound or composition. When a claim includes different features, feature classes (for example, a method step, feedstock features, product features, or both features and product features, among other possibilities), or both features and feature classes, the transitional terms comprising, consisting essentially of, and consisting of apply only to the feature class to which it is utilized, and it is possible to have different transitional terms or phrases utilized with different features within a claim. For example, a method can comprise several recited steps (and other non-recited steps), but utilize a catalyst system consisting of specific components; alternatively, consisting essentially of specific components; or alternatively, comprising the specific components and other non-recited components.

In this disclosure, while systems, processes, and methods are often described in terms of "comprising" various components, devices, or steps, the systems, processes, and methods can also "consist essentially of" or "consist of" the various components, devices, or steps, unless stated otherwise.

The term "about" as used herein means that amounts, sizes, formulations, parameters, and other quantities and characteristics are not and need not be exact, but may be approximate; larger or smaller; or both; as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about," the claims include equivalents to the quantities. The term "about" may mean within 10% of the reported numerical value, preferably within 5% of the reported numerical value.

Although any methods, devices, and materials similar or equivalent to those described herein can be used in the practice or testing of the invention, the typical methods, devices, and materials are herein described.

Figure 1:
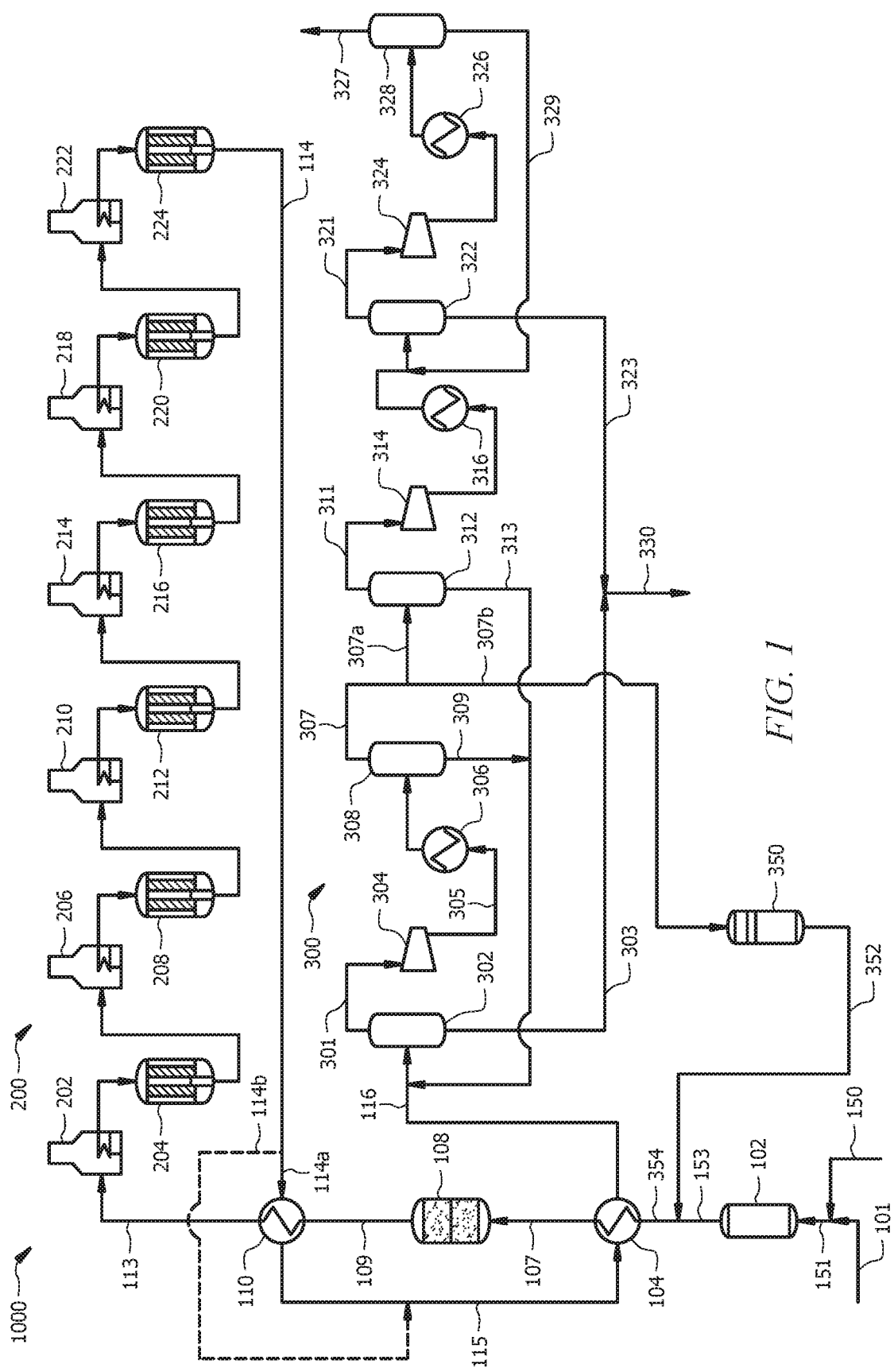
FIG. 1 illustrates a schematic of a catalytic reforming system 1000.
Figure 3:
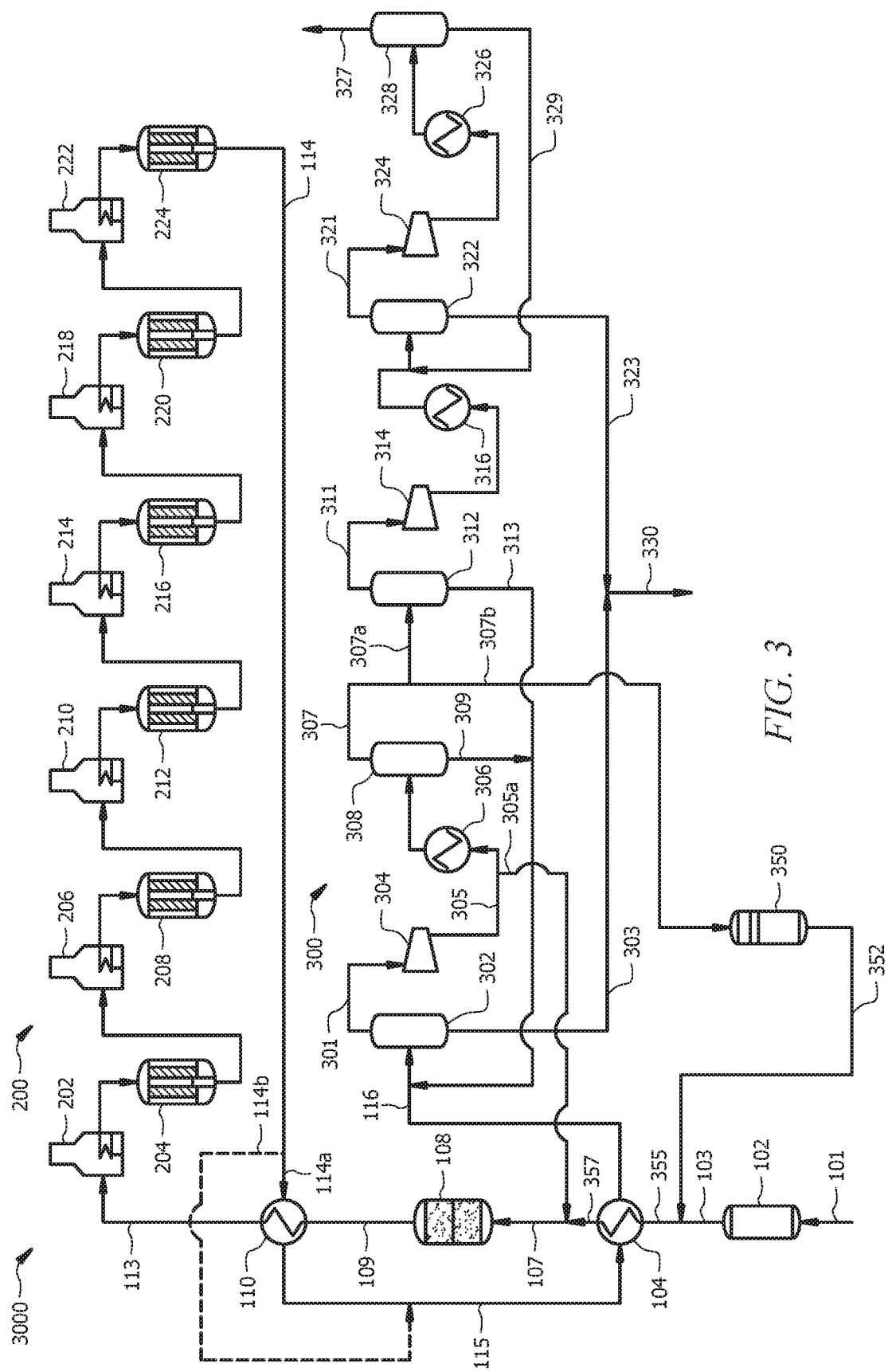
FIG. 3 illustrates a schematic of a catalytic reforming system 3000.
Figure 4:
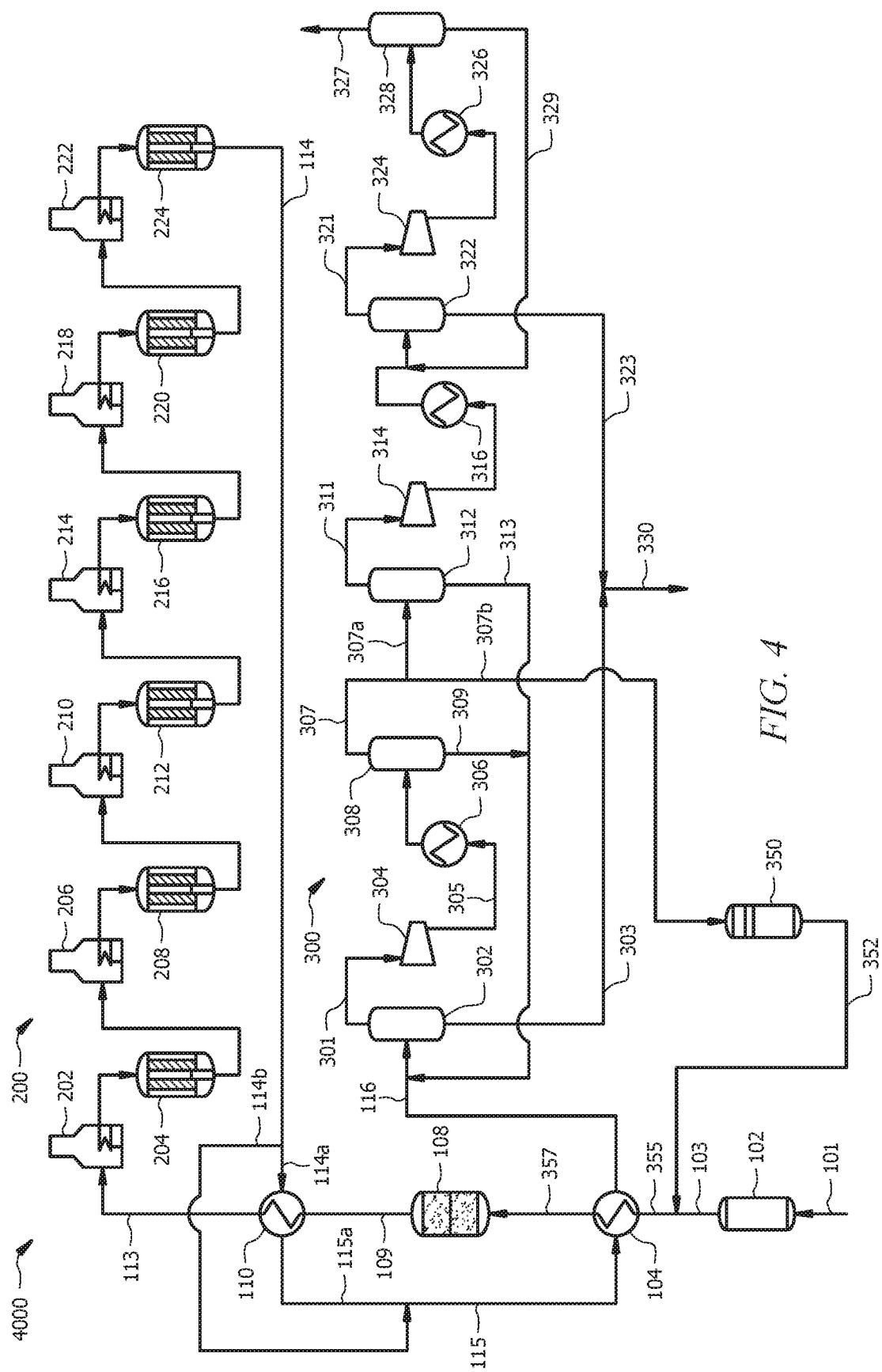
FIG. 4 illustrates a schematic of a catalytic reforming system 4000.

Referring to FIG. 1, a catalytic reforming system 1000 is disclosed. Referring to FIG. 2, a catalytic reforming system 2000 is disclosed. Referring to FIG. 3, a catalytic reforming system 3000 is disclosed. Referring to FIG. 4, a catalytic reforming system 4000 is disclosed. These figures will be discussed in combination with each other. Catalytic reforming systems 1000, 2000, 3000, 4000 generally comprise a dryer 102; a first feed stream heat exchanger 104; a sulfur removal system 108; a second feed stream heat exchanger 110; a reforming reactor section 200, wherein the reactor section 200 generally comprises a plurality of reactors 204, 208, 212, 216, 220, 224 arranged in series with furnaces 202, 206, 210, 214, 218, 222, respectively; a recycle gas section 300, wherein the recycle gas section 300 generally comprises a plurality of separation vessels 302, 308, 312, 322, 328 fluidly connected to a plurality of compressors 304, 314, 324, and to a plurality of heat exchangers 306, 316, 326; and a recycle dryer 350.

In the catalytic reforming systems disclosed herein, various system components can be in fluid communication via one or more conduits (e.g., pipes, tubing, flow lines, etc.) suitable for the conveyance of a particular stream, for example as shown in detail by the numbered streams in FIGS. 1, 2, 3, and 4. For purposes of the disclosure herein, the description of a particular component (e.g., stream, vessel, reactor, section, system, or any component thereof) present, referenced, or both in one or more Figures is generally applicable across any Figures where the component is present, referenced, or both, unless stated otherwise. For example, the description of the reforming reactor section 200 or any components thereof is applicable to any of the FIGS. 1, 2, 3, and 4, unless stated otherwise.

At the inlet of the process, a hydrocarbon feed stream can be fed via stream 101. Various feedstocks can be suitable for use with reforming processes, and generally comprise aliphatic hydrocarbons (e.g., non-aromatic hydrocarbons). Generally, an aliphatic hydrocarbon is an acyclic or cyclic, saturated or unsaturated hydrocarbon, excluding aromatic hydrocarbons; that is, an aliphatic hydrocarbon is a non-aromatic hydrocarbon. Non-limiting examples of aliphatic hydrocarbons suitable for use in the present include partially saturated hydrocarbons, completely saturated hydrocarbons, naphthenic hydrocarbons (naphthenes), cycloparaffins, and the like, or combinations thereof.

The feed (e.g., stream 101) to the catalytic reforming systems 1000, 2000, 3000, 4000 as disclosed herein can be a mixture of hydrocarbons comprising $C_6$ to $C_8$ hydrocarbons containing up to about 10 wt. %, or alternatively up to about 15 wt. % of $C_5$ and lighter hydrocarbons ($C_{5-}$); and containing up to about 10 wt. % of $C_9$ and heavier hydrocarbons ($C_{9+}$). The feed to the catalytic reforming systems as disclosed herein could include streams boiling within the 70° F.-450° F. (21° C. 232° C.) temperature range, or alternatively from about 120° F. (about 49° C.) to about 400° F. (about 204° C.). Non-limiting examples of feedstocks suitable for use in the present disclosure include straight-run naphthas from petroleum refining or fractions thereof which have been hydrotreated to remove a portion of the sulfur and other catalyst poisons. Also suitable are synthetic naphthas or naphtha fractions derived from other sources such as coal, natural gas, or from processes such as Fischer-Tropsch processes, fluid catalytic crackers, and hydrocrackers. While not shown in FIGS. 1-4, various upstream hydrocarbon pretreatment steps can be used to prepare the hydrocarbon for the reforming process. For example, hydrotreating can be used to remove catalyst poisons, such as a portion of the sulfur. Contacting the hydrocarbon with a massive nickel catalyst, for example, prior to the reforming reaction can also help protect against failure of the hydrotreating system.

In an aspect, the hydrocarbon feed stream 101 can comprise a sulfur-containing compound, an aliphatic hydrocarbon (e.g., a first aliphatic hydrocarbon), and water. In some aspects, the hydrocarbon feed stream 101 can have a sulfur content of less than about 200 parts per billion by weight (ppbw), alternatively less than about 150 ppbw, or alternatively less than about 100 ppbw, based on the total weight of the hydrocarbon stream. In some aspects, the hydrocarbon feed stream 101 can have a sulfur content of equal to or greater than about 5 ppbw, alternatively equal to or greater than about 10 ppbw, or alternatively equal to or greater than about 15 ppbw, based on the total weight of the hydrocarbon stream. As will be appreciated by one of skill in the art, and with the help of this disclosure, a sulfur content of equal to or greater than about 5 ppbw can necessitate sending the hydrocarbon feed stream 101 to a sulfur removal system, such as sulfur removal system 108. Non-limiting examples of sulfur-containing compounds that can be present in the hydrocarbon feed stream 101 include thiophenes, mercaptans, sulfides, and the like, or combinations thereof.

The process for a catalytic reforming system, such as catalytic reforming system 1000 as illustrated in FIG. 1, can comprise combining an aromatic-containing stream 150 with the hydrocarbon feed stream 101 to form an aromatized hydrocarbon feed stream 151. The aromatic-containing stream 150 can comprise an aromatic hydrocarbon, for example an aromatic hydrocarbon (e.g., benzene, toluene, etc.) recovered from a liquid product stream 330. The aromatized hydrocarbon feed stream 151 can comprise the sulfur-containing compound, the aliphatic hydrocarbon (e.g., first aliphatic hydrocarbon), water, and the aromatic hydrocarbon. While the present disclosure will be discussed in detail in the context of an aromatic-containing stream 150 comprising an aromatic hydrocarbon recovered from a catalytic reforming system, such as catalytic reforming system 1000, 2000, 3000, 4000, it should be understood that any suitable aromatic hydrocarbon or source thereof can be used in the aromatic-containing stream 150 to supply the aromatic hydrocarbon.

In some aspects, a temperature of the aromatic-containing stream 150 is greater than a temperature of the hydrocarbon feed stream 101, and as such a temperature of the aromatized hydrocarbon feed stream 151 is greater than a temperature of the hydrocarbon feed stream 101. The temperature of the hydrocarbon feed stream 101 can be from about 50° F. (about 10° C.) to about 167° F. (about 75° C.), alternatively from about 59° F. (about 15° C.) to about 149° F. (about 65° C.), or alternatively from about 68° F. (about 20° C.) to about 140° F. (about 60° C.). The temperature of the aromatic-containing stream 150 can be from about 59° F. (about 15° C.) to about 167° F. (about 75° C.), alternatively from about 59° F. (about 15° C.) to about 149° F. (about 65° C.), or alternatively from about 68° F. (about 20° C.) to about 140° F. (about 60° C.). The temperature of the resulting aromatized hydrocarbon feed stream 151 can be from about 59° F. (about 15° C.) to about 167° F. (about 75° C.), alternatively from about 59° F. (about 15° C.) to about 149° F. (about 65° C.), or alternatively from about 68° F. (about 20° C.) to about 140° F. (about 60° C.). The aromatic-containing stream 150 can have a dual purpose in the context of the current disclosure, and as illustrated in FIG. 1, wherein (1) the aromatic-containing stream 150 supplies heat and increases the temperature of the hydrocarbon feed stream via direct heat exchange; and wherein (2) the aromatic-containing stream 150 supplies the aromatic hydrocarbons to the hydrocarbon feed stream to form the aromatized hydrocarbon feed stream 151. As will be appreciated by one of skill in the art, and with the help of this disclosure, while in some aspects the temperature of the aromatic-containing stream 150 is greater than the temperature of the hydrocarbon feed stream 101; in other aspects, the temperature of the aromatic-containing stream 150 can be about the same as the temperature of the hydrocarbon feed stream 101; and in yet other aspects, the temperature of the aromatic-containing stream 150 can be lower than the temperature of the hydrocarbon feed stream 101.

The process for a catalytic reforming system, such as catalytic reforming system 1000 as illustrated in FIG. 1, can comprise feeding the aromatized hydrocarbon feed stream 151 to the drier 102 to separate the water and form a dried hydrocarbon feed stream 153. The dried hydrocarbon feed stream 153 can comprise the sulfur-containing compound, the aliphatic hydrocarbon (e.g., first aliphatic hydrocarbon), and the aromatic hydrocarbon. The drier 102 can be any suitable drier configured to remove at least a portion of the water from a hydrocarbon stream (e.g., aromatized hydrocarbon feed stream 151, hydrocarbon feed stream 101) and produce a dried hydrocarbon stream (e.g., dried hydrocarbon feed stream 153, dried hydrocarbon feed stream 103). For example, the drier 102 can comprise a desiccant, such as calcium chloride, that can separate (e.g., absorb) at least a portion of the water from a hydrocarbon stream. In an aspect, the dried hydrocarbon feed stream 153 can be substantially free of water. In an aspect, the dried hydrocarbon feed stream 153 can comprise water in an amount of less than about 1 wt. %, alternatively less than about 0.1 wt. %, alternatively less than about 0.01 wt. %, or alternatively less than about 0.001 wt. %, based on the total weight of the dried hydrocarbon feed stream 153.

The process for a catalytic reforming system, such as catalytic reforming system 2000, 3000 as illustrated in FIGS. 2-3, can comprise feeding the hydrocarbon feed stream 101 to the drier 102 to separate the water and form a dried hydrocarbon feed stream 103. The dried hydrocarbon feed stream 103 can comprise the sulfur-containing compound and the aliphatic hydrocarbon (e.g., first aliphatic hydrocarbon). In an aspect, the dried hydrocarbon feed stream 103 can be substantially free of water. In an aspect, the dried hydrocarbon feed stream 103 can comprise water in an amount of less than about 1 wt. %, alternatively less than about 0.1 wt. %, alternatively less than about 0.01 wt. %, or alternatively less than about 0.001 wt. %, based on the total weight of the dried hydrocarbon feed stream 103.

In an aspect, and as illustrated in FIG. 1, the dried hydrocarbon feed stream 153 can be combined with a recycle gas stream 352 to form an inlet stream 354 to the first feed stream heat exchanger 104. The recycle gas stream 352 can comprise hydrogen. For example, the recycle gas stream 352 can comprise hydrogen in an amount of equal to or greater than about 1 mol %, alternatively equal to or greater than about 5 mol %, or alternatively equal to or greater than about 10 mol %. The recycle gas stream 352 can be recovered from the recycle gas section 300 of the catalytic reforming system, as disclosed herein. The inlet stream 354 can comprise the sulfur-containing compound, the aliphatic hydrocarbon (e.g., first aliphatic hydrocarbon), the aromatic hydrocarbon, and hydrogen. For purposes of the disclosure herein, the inlet stream 354 can also be referred to as "aromatized hydrocarbon feed stream 354," owing to containing both an aliphatic hydrocarbon (e.g., first aliphatic hydrocarbon) and the aromatic hydrocarbon. While the present disclosure will be discussed in detail in the context of recycle streams 352, 353 comprising hydrogen being combined with a dried hydrocarbon feed stream to form a first heat exchanger feed stream, it should be understood that any suitable gas stream comprising hydrogen or source thereof can be used to supply the hydrogen.

In an aspect, and as illustrated in FIG. 2, the dried hydrocarbon feed stream 103 can be combined with an aromatized recycle stream 353 to form the inlet stream 354 to the first feed stream heat exchanger 104. The aromatized recycle stream 353 can comprise the aromatic hydrocarbon and hydrogen. The aromatized recycle stream 353 can be produced by combining the recycle gas stream 352 with an effluent stream 305a recovered from the recycle gas section 300 of the catalytic reforming system, as disclosed herein, wherein the effluent stream 305a comprises the aromatic hydrocarbon. The effluent stream 305a can further comprise hydrogen. As will be appreciated by one of skill in the art, and with the help of this disclosure, in configurations where the effluent stream 305a can supply a portion of the necessary hydrogen to the hydrocarbon feed stream, for example via aromatized recycle stream 353, a smaller volume of the recycle gas stream 352 can be recycled to the hydrocarbon feed stream.

In some aspects, and as illustrated in FIG. 2, a temperature of the effluent stream 305a is greater than a temperature of the recycle gas stream 352, and as such a temperature of the aromatized recycle stream 353 is greater than a temperature of the recycle gas stream 352. The temperature of the recycle gas stream 352 can be from about 41° F. (about 5° C.) to about 95° F. (about 35° C.), alternatively from about 41° F. (about 5° C.) to about 86° F. (about 30° C.), or alternatively from about 50° F. (about 10° C.) to about 77° F. (about 25° C.). The temperature of the effluent stream 305a can be from about 300° F. (about 149° C.) to about 400° F. (about 204° C.), alternatively from about 310° F. (about 154° C.) to about 390° F. (about 199° C.), or alternatively from about 325° F. (about 163° C.) to about 375° F. (about 191° C.).

In some aspects, and as illustrated in FIG. 2, a temperature of the aromatized recycle stream 353 is greater than a temperature of the dried hydrocarbon feed stream 103, and as such a temperature of the inlet stream 354 is greater than a temperature of the dried hydrocarbon feed stream 103.

The temperature of the dried hydrocarbon feed stream 103 can be from about 77° F. (about 25° C.) to about 140° F. (about 60° C.), alternatively from about 86° F. (about 30° C.) to about 131° F. (about 55° C.), or alternatively from about 95° F. (about 35° C.) to about 122° F. (about 50° C.). The temperature of the aromatized recycle stream 353 can be from about 86° F. (about 30° C.) to about 374° F. (about 190° C.), alternatively from about 140° F. (about 60° C.) to about 356° F. (about 180° C.), or alternatively from about 176° F. (about 80° C.) to about 338° F. (about 170° C.). As will be appreciated by one of skill in the art, and with the help of this disclosure, the temperature of stream 353 is dependent on the mixing ratio of streams 305a and 352. The aromatized recycle stream 353 has a dual purpose in the context of the current disclosure, and as illustrated in FIG. 2, wherein (1) the aromatized recycle stream 353 supplies heat and increases the temperature of the hydrocarbon feed stream via direct heat exchange; and wherein (2) the aromatized recycle stream 353 supplies the aromatic hydrocarbons to the hydrocarbon feed stream to form the inlet stream 354.

In an aspect, and as illustrated in FIG. 3, the dried hydrocarbon feed stream 103 can be combined with the recycle gas stream 352 to form an inlet stream 355 to the first feed stream heat exchanger 104. The inlet stream 355 can comprise the sulfur-containing compound, the aliphatic hydrocarbon (e.g., first aliphatic hydrocarbon), and hydrogen.

In an aspect, and as illustrated in FIGS. 1 and 2, the inlet stream 354 can be passed through the first feed stream heat exchanger 104 to heat (e.g., increase a temperature of) the inlet stream 354 and produce a heated stream 107. For purposes of the disclosure herein, the heated stream 107 can also be referred to as "aromatized hydrocarbon feed stream 107," owing to containing both an aliphatic hydrocarbon (e.g., first aliphatic hydrocarbon) and the aromatic hydrocarbon. A temperature of the heated stream 107 is greater than a temperature of the inlet stream 354. The inlet stream 354 can capture heat from a reactor effluent stream 115, wherein a temperature of the reactor effluent stream 115 is greater than a temperature of the inlet stream 354, and wherein the reactor effluent stream 115 gives away heat and produces a cooled reactor effluent stream 116. As will be appreciated by one of skill in the art, and with the help of this disclosure, the composition of a stream (e.g., inlet stream 354, 355; reactor effluent stream 115) is not affected by heating it or cooling it, and as such the composition of the heated or cooled stream (e.g., heated stream 107, heated stream 357; cooled reactor effluent stream 116) resulting from a heat exchange step is the same as the composition of its corresponding stream, although some of the components (e.g., aromatic hydrocarbons) might change the phase they are present in, for example a component might change from a liquid phase to a gas phase, or a component might change from a gas phase to a liquid phase. For example, the composition of heated stream 107 is the same as the composition of inlet stream 354. As another example, the composition of heated stream 357 is the same as the composition of inlet stream 355. As yet another example, the composition of reactor effluent stream 115 is the same as the composition of cooled reactor effluent stream 116. While the present disclosure will be discussed in detail in the context of reactor effluent stream 114 and reactor effluent stream 115 recovered from the reforming reactor section 200 being used to provide heat in the first feed stream heat exchanger 104 and the second feed stream heat exchanger 110, respectively, it should be understood that any suitable stream with a suitably elevated temperature (e.g., a hot stream) can be used to supply the heat.

In an aspect, and as illustrated in FIG. 3, the inlet stream 355 can be passed through the first feed stream heat exchanger 104 to heat (e.g., increase a temperature of) the inlet stream 355 and produce a heated stream 357. A temperature of the heated stream 357 is greater than a temperature of the inlet stream 355. The inlet stream 355 can capture heat from reactor effluent stream 115, wherein a temperature of reactor effluent stream 115 is greater than a temperature of the inlet stream 355, and wherein reactor effluent stream 115 gives away heat and produces a cooled reactor effluent stream 116. As will be appreciated by one of skill in the art, and with the help of this disclosure, the composition of heated stream 357 is the same as the composition of inlet stream 355.

In an aspect, and as illustrated in FIG. 3, the heated stream 357 can be combined with the effluent stream 305a recovered from the recycle gas section 300 of the catalytic reforming system, as disclosed herein, to produce the heated stream 107. As will be appreciated by one of skill in the art, and with the help of this disclosure, in configurations where the effluent stream 305a can supply a portion of the necessary hydrogen to the hydrocarbon feed stream, for example by combining the effluent stream 305a with the heated stream 357, a smaller volume of the recycle gas stream 352 can be recycled to the hydrocarbon feed stream.

In some aspects, and as illustrated in FIG. 3, a temperature of the heated stream 107 is greater than a temperature of the effluent stream 305a. The temperature of the heated stream 357 can be from about 392° F. (about 200° C.) to about 752° F. (about 400° C.), alternatively from about 464° F. (about 240° C.) to about 698° F. (about 370° C.), or alternatively from about 500° F. (about 260° C.) to about 662° F. (about 350° C.). The effluent stream 305a supplies the aromatic hydrocarbons to the hydrocarbon feed stream to form the heated stream 107.

In an aspect, the process for a catalytic reforming system, such as catalytic reforming system 1000, 2000, 3000 as illustrated in FIGS. 1-3, can comprise (i) combining, upstream of the sulfur removal system 108 in the catalytic reforming system, a first stream comprising an aromatic hydrocarbon with a second stream to form a combined stream comprising the aromatic hydrocarbon; and (ii) feeding the aromatic hydrocarbon to the sulfur removal system 108, wherein the aromatic hydrocarbon which is fed to the sulfur removal system 108 is contained in or obtained from the combined stream.

In an aspect, the first stream and the second stream can be combined in a ratio effective to provide for an additional amount of the aromatic hydrocarbon (e.g., supplemental aromatic hydrocarbons, additional aromatic hydrocarbons) in the heated stream 107 of from about 0.01 wt. % to about 10 wt. %, alternatively from about 0.1 wt. % to about 7.5 wt. %, or from about 1 wt. % to about 5 wt. %, based on the total weight of the heated stream 107. As will be appreciated by one of skill in the art, and with the help of this disclosure, the "additional amount of the aromatic hydrocarbon" refers to aromatic hydrocarbons that were introduced to the combined stream only by the first stream, in addition to (e.g., supplemental to) any aromatic hydrocarbons that might already be present in the second stream (e.g., feed stream). The supplemental aromatic hydrocarbons (or additional aromatic hydrocarbons) refer to the aromatic hydrocarbons that are purposefully recycled into the process (e.g., for example via the first stream), and such supplemental aromatic hydrocarbons will be present in the combined stream in addition to any aromatic hydrocarbons that might already be present in the second stream (e.g., feed stream). Further, and as will be appreciated by one of skill in the art, and with the help of this disclosure, the amount of aromatic hydrocarbon introduced to the combined stream is greater than a residual amount of aromatics that could be introduced to the combined stream via recycle streams, such as for example gas recycle stream 352.

In an aspect, and for example as illustrated in the configuration of FIG. 2, a temperature of the first stream comprising an aromatic hydrocarbon is higher than a temperature of the second stream. The temperature of the first stream comprising an aromatic hydrocarbon can be from about 300° F. (about 149° C.) to about 400° F. (about 204° C.). The temperature of the second stream can be from about 68° F. (about 20° C.) to about 212° F. (about 100° C.). The first stream has a dual purpose in the context of the current disclosure, wherein (1) the first stream supplies heat, and can increase a temperature of the combined stream, for example via direct heat exchange; and wherein (2) the first stream supplies the aromatic hydrocarbons.

In an aspect, and as illustrated in FIG. 1, the first stream is the aromatic-containing stream 150; the second stream is the hydrocarbon feed stream 101; and the combined stream produced by combining the first stream and the second stream is the aromatized hydrocarbon feed stream 151. In such aspect, the aromatic hydrocarbon which is fed to the sulfur removal system 108 is obtained from the combined stream (e.g., aromatized hydrocarbon feed stream 151), wherein the combined stream is fed to the drier 102 in the catalytic reforming system 1000, and wherein the drier 102 is in fluid communication with the sulfur removal system 108.

In an aspect, and as illustrated in FIG. 2, the first stream is the effluent stream 305a recovered from the recycle gas section 300 of the catalytic reforming system; the second stream is the recycle gas stream 352; and the combined stream produced by combining the first stream and the second stream is the aromatized recycle stream 353. In such aspect, the aromatic hydrocarbon which is fed to the sulfur removal system 108 is obtained from the combined stream (e.g., aromatized recycle stream 353), wherein the combined stream is further combined with an inlet stream of the first feed stream heat exchanger 104 of the catalytic reforming system 2000, and wherein the first feed stream heat exchanger 104 is in fluid communication with the sulfur removal system 108. The inlet stream of the first feed stream heat exchanger 104 can comprise the dried hydrocarbon feed stream 103, wherein combining the dried hydrocarbon feed stream 103 with the combined stream produces the inlet stream 354.

In an aspect, and as illustrated in FIG. 3, the first stream is the effluent stream 305a recovered from the recycle gas section 300 of the catalytic reforming system; the second stream is the heated stream 357; and the combined stream produced by combining the first stream and the second stream is the heated stream 107. In such aspect, the aromatic hydrocarbon which is fed to the sulfur removal system 108 is contained in the combined stream (e.g., heated stream 107).

In an aspect, the first stream comprising the aromatic hydrocarbon can comprise a portion of an effluent stream flowing from a donor reactor of a plurality of reactor-furnace pairs connected in series (e.g., from reforming reactor section 200) in the catalytic reforming system. For purposes of the disclosure herein, the combination of a furnace coupled to a downstream reactor (e.g., reforming reactor, aromatization reactor) can be referred to throughout the present specification as a "reactor-furnace pair." The donor reactor can be reactor 204, reactor 208, reactor 212, reactor 216, reactor 220, reactor 224, or combinations thereof, as disclosed herein; or any other suitable reforming reactor that produces aromatic hydrocarbons. In an aspect, the donor reactor can be the last reactor of the plurality of reactor-furnace pairs, such as reactor 224.

In an aspect, the process for a catalytic reforming system, such as catalytic reforming system 1000, 2000, 3000 as illustrated in FIGS. 1-3, can comprise feeding the heated stream 107 comprising the aromatic hydrocarbon to the sulfur removal system 108 to produce a reduced sulfur stream 109. The reduced sulfur stream 109 can comprise the first aliphatic hydrocarbon and a second aliphatic hydrocarbon. The aromatic hydrocarbon is converted to an aliphatic hydrocarbon (e.g., second aliphatic hydrocarbon) by exothermic reaction in the sulfur removal system 108. Without wishing to be limited by theory, and as will be appreciated by one of skill in the art, and with the help of this disclosure, the hydrogenation (e.g., full hydrogenation; partial hydrogenation) of the aromatic hydrocarbon to an aliphatic hydrocarbon (e.g., second aliphatic hydrocarbon) is exothermic. The sulfur-containing compound can be removed from the heated stream 107 in the sulfur removal system 108. In some aspects, the reduced sulfur stream 109 can be substantially free of sulfur. In an aspect, the reduced sulfur stream 109 can comprise sulfur in an amount of less than about 1 wt. %, alternatively less than about 0.1 wt. %, alternatively less than about 0.01 wt. %, or alternatively less than about 0.001 wt. %, based on the total weight of the reduced sulfur stream 109. In an aspect, the reduced sulfur stream 109 can further comprise hydrogen.

In some aspects, the aromatic hydrocarbon can comprise benzene, toluene, or both benzene and toluene, and the exothermic reaction can be a hydrogenation reaction of benzene, toluene, or both benzene and toluene to cyclohexane, methylcyclohexane, or both cyclohexane and methylcyclohexane, respectively. Other benzene and toluene hydrogenation products include without limitation cyclohexene, methylcyclohexenes, etc.

The sulfur removal system 108 can be used to reduce the amount of sulfur in the hydrocarbon stream and can comprise any suitable sulfur removal system capable of removing sulfur from a hydrocarbon stream, such as the heated stream 107. In some aspects, the sulfur removal system 108 can also act as a precaution or backup in case any upstream hydrotreating system fails or has an operating upset. In an aspect, the sulfur removal system 108 can comprise one or more vessels that allow the heated stream 107 to pass as a fluid through a sulfur removal system comprising a sulfur converter containing a group VIII metal and a sulfur adsorber. The sulfur adsorber can comprise an inorganic oxide, such as zeolites, molecular sieves, alumina, silica, aluminosilicates, potassium oxide, sodium oxide, and the like, or combinations thereof. In some aspects, the sulfur adsorber can comprise a catalyst, such as a reforming or aromatization catalyst as disclosed herein. In an aspect, the sulfur converter can contain a sulfur converting material comprising at least one group VIII metal (e.g., Pt, Ni, Co, etc.) on an inorganic oxide substrate, such as zeolites, molecular sieves, alumina, silica, aluminosilicates, potassium oxide, sodium oxide, and the like, or combinations thereof. In an aspect, the sulfur converting material can comprise Pt on alumina.

In an aspect, the sulfur removal system 108 can operate at a temperature of from about 500° F. (260° C.) to about 600° F. (316° C.), alternatively from about 510° F. (266° C.) to about 590° F. (310° C.), or alternatively from about 525° F. (274° C.) to about 575° F. (302° C.). Without wishing to be limited by theory, while the hydrogenation reaction of aromatic hydrocarbons to form aliphatic hydrocarbons (e.g., in the presence of a reforming catalyst) is reversible, at temperatures of from about 500° F. (260° C.) to about 600° F. (316° C.), the equilibrium of this reversible reaction is shifted towards producing aliphatic hydrocarbons. In an aspect, at least a portion of the aromatic hydrocarbons can react with hydrogen in the sulfur removal system 108 to form an aliphatic hydrocarbon (e.g., second aliphatic hydrocarbon) and produce heat. In an aspect, a temperature of the reduced sulfur stream 109 is greater than a temperature of the heated stream 107. As will be appreciated by one of skill in the art, and with the help of this disclosure, the amount of aromatic hydrocarbon introduced to the sulfur removal system 108 impacts the magnitude of temperature increase between the heated stream 107 and the reduced sulfur stream 109, owing to the aromatic hydrocarbon undergoing an exothermic reaction in the sulfur removal system 108. Further, as will be appreciated by one of skill in the art, and with the help of this disclosure, the amount of aromatic hydrocarbon introduced to the sulfur removal system 108 impacts an operating temperature of the sulfur removal system 108. Without wishing to be limited by theory, an increase in the operating temperature of the sulfur removal system 108 can advantageously allow for processing a higher volume of hydrocarbon feed through the same sulfur removal system 108, provided that when the heated stream 107 comprises aromatic hydrocarbons as disclosed herein, the operating temperature of the sulfur removal system 108 does not exceed a temperature that allows for the conversion of aromatic hydrocarbons to aliphatic hydrocarbons.

In an aspect, the process for a catalytic reforming system, such as catalytic reforming system 1000, 2000, 3000 as illustrated in FIGS. 1-3, can comprise controlling an amount of aromatic hydrocarbon fed to the sulfur removal system 108 in the catalytic reforming system such that a temperature of the reduced sulfur stream 109 flowing from the sulfur removal system 108 is higher than a temperature of the heated stream 107 which is fed to the sulfur removal system 108, due to a heat of reaction generated in the sulfur removal system 108 by converting at least a portion of the aromatic hydrocarbon to an aliphatic hydrocarbon (e.g., the second aliphatic hydrocarbon).

In an aspect, the process for a catalytic reforming system, such as catalytic reforming system 1000, 2000, 3000 as illustrated in FIGS. 1-3, can comprise (i) feeding aromatics (e.g., aromatic hydrocarbons), for example via the heated stream 107, at a first temperature to the sulfur removal system 108 located upstream of a plurality of reactor-furnace pairs (e.g., in the reforming reactor section 200); (ii) converting at least a portion of the aromatics to non-aromatics (e.g., aliphatic hydrocarbons; second aliphatic hydrocarbons) via exothermic reaction in the sulfur removal system 108; and (iii) recovering an effluent, for example via reduced sulfur stream 109, from the sulfur removal system 108 having a second temperature that is greater than the first temperature due to the exothermic reaction in the step of (ii) converting. In an aspect, a difference between the first temperature and the second temperature can be equal to or greater than about 18° F. (10° C.), alternatively equal to or greater than about 36° F. (20° C.), or alternatively equal to or greater than about 54° F. (30° C.).

In an aspect, and as illustrated in FIG. 1, a temperature of the reduced sulfur stream 109 can be greater than a temperature of one or more of i) the heated stream 107, ii) the dried hydrocarbon feed stream 153, iii) the aromatized hydrocarbon feed stream 151, or iv) the hydrocarbon feed stream 101 due to a heat of reaction generated in the step of converting the aromatic hydrocarbon to an aliphatic hydrocarbon in the sulfur removal system 108. Combining the aromatic-containing stream 150 with the hydrocarbon feed stream 101 can provide for aromatic hydrocarbons (e.g., supplemental aromatic hydrocarbons, additional aromatic hydrocarbons) in the sulfur removal system 108, wherein the aromatic hydrocarbons can undergo an exothermic hydrogenation reaction, thereby producing heat and increasing the temperature of the reduced sulfur stream 109.

In an aspect, and as illustrated in FIG. 2, a temperature of the reduced sulfur stream 109 can be greater than a temperature of one or more of i) the heated stream 107, ii) the dried hydrocarbon feed stream 103, or iii) the aromatized hydrocarbon feed stream 354, due to a heat of reaction generated in the step of converting the aromatic hydrocarbon to an aliphatic hydrocarbon in the sulfur removal system 108.

In an aspect, and as illustrated in FIG. 2, a temperature of the reduced sulfur stream 109 can be greater than a temperature of one or more of i) the heated stream 107, ii) the dried hydrocarbon feed stream 103, or iii) the aromatized hydrocarbon feed stream 354 due to the step of combining the aromatized recycle stream 353 with the dried hydrocarbon feed stream 103. Combining the aromatized recycle stream 353 with the dried hydrocarbon feed stream 103 can provide for (1) aromatic hydrocarbons in the sulfur removal system 108, wherein the aromatic hydrocarbons can undergo an exothermic hydrogenation reaction, thereby producing heat and increasing the temperature of the reduced sulfur stream 109; (2) increasing the temperature of the dried hydrocarbon feed stream 103 by combining it with a stream having a higher temperature (e.g., aromatized recycle stream 353), thereby leading to increasing the temperature of the heated stream 107, and consequently increasing the temperature of the reduced sulfur stream 109; or (3) both (1) and (2).

In an aspect, and as illustrated in FIG. 3, a temperature of the reduced sulfur stream 109 can be greater than a temperature of one or more of i) the heated stream 357 or ii) the aromatized hydrocarbon feed stream 107, due to a heat of reaction generated in the step of converting the aromatic hydrocarbon to an aliphatic hydrocarbon in the sulfur removal system 108. Combining the effluent stream 305*a* with the heated stream 357 can provide for aromatic hydrocarbons in the sulfur removal system 108, wherein the aromatic hydrocarbons can undergo an exothermic hydrogenation reaction, thereby producing heat and increasing the temperature of the reduced sulfur stream 109.

In an aspect, increasing the temperature of the reduced sulfur stream 109, as compared to a reduced sulfur stream that is produced in an otherwise similar catalytic reforming system that does not employ aromatizing the hydrocarbon feed stream, can further lead to decreasing a heat duty of a first furnace 202 of a plurality of reactor-furnace pairs connected in series (e.g., in reforming reactor section 200) in the catalytic reforming system. A higher temperature of the reduced sulfur stream 109 can lead to a higher temperature of a catalytic reforming reactor feed 113, as compared to a temperature of a catalytic reforming reactor feed that is produced in an otherwise similar catalytic reforming system that does not employ aromatizing the hydrocarbon feed stream; which in turn can result in the first furnace 202 having a decreased heat duty when heating the catalytic reforming reactor feed 113 to a temperature effective for a reforming reaction (e.g., the first furnace 202 has to supply a smaller temperature increase (ΔT) to a feed stream to the reactor 204).

In an aspect, a temperature increase (ΔT) that the first furnace 202 has to supply to a feed stream to the reactor 204 in a catalytic reforming system that employs aromatizing the hydrocarbon feed stream upstream of the sulfur removal system as disclosed herein can be decreased by equal to or greater than about 5° C., alternatively equal to or greater than about 10° C., or alternatively equal to or greater than about 15° C., when compared to a temperature increase that a first furnace has to supply to a feed stream to a first reactor in an otherwise similar catalytic reforming system that does not employ aromatizing a hydrocarbon feed stream upstream of a sulfur removal system.

In an aspect, the process for a catalytic reforming system, such as catalytic reforming system 1000, 2000, 3000 as illustrated in FIGS. 1-3, can comprise feeding an effective amount of aromatic hydrocarbons to the sulfur removal system 108 of the catalytic reforming system such that a heat duty of a first furnace 202 of a plurality of reactor-furnace pairs connected in series in the catalytic reforming system can be reduced relative to operation of the sulfur removal system without the effective amount of aromatic hydrocarbons. In such aspect, the effective amount of aromatic hydrocarbons can be provided by a concentration of less than about 10 wt. % supplemental aromatic hydrocarbons (e.g., additional aromatic hydrocarbons) based on a total weight in a stream containing the supplemental aromatic hydrocarbons which is fed to the sulfur removal system 108.

In an aspect, a heat duty of the first furnace 202 can be reduced compared to operation of the sulfur removal system 108 without the steps of (i) feeding aromatics (e.g., aromatic hydrocarbons), for example via the heated stream 107, at a first temperature to the sulfur removal system 108 located upstream of a plurality of reactor-furnace pairs (e.g., in the reforming reactor section 200); and (ii) converting at least a portion of the aromatics to non-aromatics (e.g., aliphatic hydrocarbons; second aliphatic hydrocarbons) via exothermic reaction in the sulfur removal system 108.

In some aspects, the heat duty of the first furnace 202 can be reduced by equal to or greater than about 0.5%, alternatively equal to or greater than about 1%, or alternatively equal to or greater than about 2%, when compared to operation of the sulfur removal system 108 without the steps of (i) feeding aromatics (e.g., aromatic hydrocarbons), for example via the heated stream 107, at a first temperature to the sulfur removal system 108 located upstream of a plurality of reactor-furnace pairs (e.g., in the reforming reactor section 200); and (ii) converting at least a portion of the aromatics to non-aromatics (e.g., aliphatic hydrocarbons; second aliphatic hydrocarbons) via exothermic reaction in the sulfur removal system 108.

In some aspects, a temperature increase (ΔT) supplied by the first furnace 202 to a feed stream to the reactor 204, such as catalytic reforming reactor feed 113, can be reduced by equal to or greater than about 0.5%, alternatively equal to or greater than about 1%, or alternatively equal to or greater than about 2%, when compared to operation of the sulfur removal system 108 without the steps of (i) feeding aromatics (e.g., aromatic hydrocarbons), for example via the heated stream 107, at a first temperature to the sulfur removal system 108 located upstream of a plurality of reactor-furnace pairs (e.g., in the reforming reactor section 200); and (ii) converting at least a portion of the aromatics to non-aromatics (e.g., aliphatic hydrocarbons; second aliphatic hydrocarbons) via exothermic reaction in the sulfur removal system 108.

In an aspect, the process for a catalytic reforming system, such as catalytic reforming system 1000, 2000, 3000 as illustrated in FIGS. 1-3, can comprise (i) flowing the reduced sulfur stream 109 comprising the second aliphatic hydrocarbon generated in the sulfur removal system 108 from the sulfur removal system 108 to the second feed stream heat exchanger 110; and (ii) heating the reduced sulfur stream 109 in the second feed stream heat exchanger 110 to form the catalytic reforming reactor feed stream 113 comprising both the first aliphatic hydrocarbon and the second aliphatic hydrocarbon. In an aspect, both the first aliphatic hydrocarbon and the second aliphatic hydrocarbon are heated in the second feed stream heat exchanger 110 to form the catalytic reforming reactor feed stream 113 comprising both the first aliphatic hydrocarbon and the second aliphatic hydrocarbon.

In an aspect, and as illustrated in FIGS. 1-3, the reduced sulfur stream 109 can be passed through the second feed stream heat exchanger 110 to heat (e.g., increase a temperature of) the reduced sulfur stream 109 and produce the catalytic reforming reactor feed stream 113. A temperature of the catalytic reforming reactor feed stream 113 is greater than a temperature of the reduced sulfur stream 109. The reduced sulfur stream 109 can capture heat from a reactor effluent stream 114 flowing from a donor reactor of a plurality of reactor-furnace pairs (e.g., from reforming reactor section 200) in the catalytic reforming system, wherein a temperature of the reactor effluent stream 114 is greater than a temperature of the reduced sulfur stream 109, and wherein the reactor effluent stream 114 gives away heat and produces reactor effluent stream 115. The donor reactor can be reactor 204, reactor 208, reactor 212, reactor 216, reactor 220, reactor 224, or combinations thereof, as disclosed herein. In an aspect, the donor reactor can be the last reactor of the plurality of reactor-furnace pairs, such as reactor 224, in configurations where the plurality of reactor-furnace pairs are connected in series.

As will be appreciated by one of skill in the art, and with the help of this disclosure, the composition of a stream (e.g., reduced sulfur stream 109; reactor effluent stream 114) is not affected by heating it or cooling it, and as such the composition of the heated or cooled stream (e.g., catalytic reforming reactor feed stream 113; reactor effluent stream 115) resulting from a heat exchange step is the same as the composition of its corresponding stream, although some of the components might change the phase they are present in, for example a component might change from a liquid phase to a gas phase, or a component might change from a gas phase to a liquid phase. For example, the composition of catalytic reforming reactor feed stream 113 is the same as the composition of the reduced sulfur stream 109. As another example, the composition of reactor effluent stream 115 is the same as the composition of the reactor effluent stream 114. Heating the reduced sulfur stream 109 in the second feed stream heat exchanger 110 can comprise heating the aliphatic hydrocarbons (e.g., first aliphatic hydrocarbon; second aliphatic hydrocarbon) of the reduced sulfur stream 109 to form the catalytic reforming reactor feed stream 113. In an aspect, the catalytic reforming reactor feed stream 113 can comprise aliphatic hydrocarbons, such as the first aliphatic hydrocarbon and the second aliphatic hydrocarbon. The catalytic reforming reactor feed stream 113 can further comprise hydrogen. As will be appreciated by one of skill in the art, and with the help of this disclosure, the catalytic reforming processes disclosed herein are based on heavily endothermic reactions of conversion of aliphatic hydrocarbons to aromatics, and as such the feed to reforming reactors needs to be pre-heated, for example by capturing and using a portion of the heat of the reactor effluent stream 114, 115, such as in the first feed stream heat exchanger 104, and the second feed stream heat exchanger 110.

In an aspect, a portion 114b of a reactor effluent stream 114 can bypass the second feed stream heat exchanger 110 and be combined with reactor effluent stream 115 prior to introducing reactor effluent stream 115 to the first feed stream heat exchanger 104.

In an aspect, the process for a catalytic reforming system, such as catalytic reforming system 1000, 2000, 3000 as illustrated in FIGS. 1-3, can comprise (i) flowing a first portion 114a of the reactor effluent stream 114 to the second feed stream heat exchanger 110 of the catalytic reforming system; (ii) using the first portion 114a to heat the reduced sulfur stream 109 obtained from the sulfur removal system 108 in the second feed stream heat exchanger 110; (iii) flowing a second portion 114b of the reactor effluent stream 114 to the first feed stream heat exchanger 104 of the catalytic reforming system, for example via reactor effluent stream 115; and (iv) using the second portion 114b to heat the aromatic hydrocarbon prior to feeding the aromatic hydrocarbon to the sulfur removal system 108. As illustrated in FIGS. 1 and 2, the aromatic hydrocarbon is contained in inlet stream 354 to the first feed stream heat exchanger 104, wherein the second portion 114b can be used to heat the aromatic hydrocarbon prior to feeding the aromatic hydrocarbon to the sulfur removal system 108. As illustrated in FIG. 3, the aromatic hydrocarbon is provided by the effluent stream 305a, and the heated stream 357 that has been heated in part by the second portion 114b can further heat the aromatic hydrocarbon prior to feeding the aromatic hydrocarbon to the sulfur removal system 108, when combining the heated stream 357 with the effluent stream 305a.

A temperature of the reactor effluent stream 114 is greater than a temperature of the reactor effluent stream 115, and by combining a portion of the reactor effluent stream 114 (e.g., a second portion 114b) with the reactor effluent stream 115 prior to introducing the reactor effluent stream 115 to the first feed stream heat exchanger 104, the temperature of reactor effluent stream 115 is increased, thereby leading to an increased temperature of the heated stream 357 and heated stream 107. An increased temperature of the heated stream 357 and heated stream 107 can allow for an increase in the operating temperature of the sulfur removal system 108.

In an aspect, the process for a catalytic reforming system, such as catalytic reforming system 1000, 2000, 3000 as illustrated in FIGS. 1-3, can comprise introducing the catalytic reforming reactor feed stream 113 to the reforming reactor section 200 to produce reforming reactor effluent stream 114. For example, the catalytic reforming reactor feed stream 113 can be fed to a first pair of a plurality of reactor-furnace pairs of the reforming reactor section 200.

The reforming reactor section 200 can generally comprise a plurality of reactors 204, 208, 212, 216, 220, 224 arranged in series with furnaces 202, 206, 210, 214, 218, 222 located upstream of each reactor, respectively. While the present disclosure is discussed in detail in the context of a reforming reactor section such as reforming reactor section 200 comprising a plurality of reactor-furnace pairs connected in series, it should be understood that any suitable configuration of furnaces and reactors (e.g., in series, in parallel, both in series and in parallel) can be used for reforming (e.g., aromatizing) the catalytic reforming reactor feed stream 113 and producing reactor effluent stream 114.

The furnaces 202, 206, 210, 214, 218, 222 can comprise any type of furnace capable of raising the temperature of a reactant stream to achieve a desired inlet temperature to the paired reactor. The temperature can be raised as necessary so that the reforming reactions proceed in the subsequent reactors, which is generally needed due to the endothermic nature of the reforming process.

The reactor section 200 can consist of a plurality of reactor-furnace pairs. In an aspect, the reaction zone 200 comprises three or more serially connected reactors. All of the reactors 204, 208, 212, 216, 220, 224 can be the same or different in size or configuration. In an aspect, all of the reactors 204, 208, 212, 216, 220, 224 can be radial flow reactors with the hydrocarbon stream passing through the reactors in inward or outward flow. In an aspect, the reactors can be the same size. Alternatively, one or more reactors can be different sizes.

In general, the reforming reaction occurs under process conditions that thermodynamically favor dehydrocyclization reactions and limit undesirable hydrocracking reactions. The reforming reaction can be carried out using any conventional reforming conditions, and can be carried out at reactor inlet temperatures ranging from about 600° F. (316° C.) to about 1,100° F. (593° C.), alternatively from about 650° F. (343° C.) to about 1,100° F. (593° C.), alternatively from about 700° F. (371° C.) to about 1,100° F. (593° C.), alternatively from about 800° F. (427° C.) to about 1,050° F. (566° C.), or alternatively from about 850° F. (454° C.) to about 1,050° F. (566° C.). Reaction pressures can range from about atmospheric pressure to about 500 psig (3.45 MPag), alternatively from about 25 psig (0.17 MPag) to about 300 psig (2.07 MPag), or alternatively from about 30 psig (0.21 MPag) to about 100 psig (0.689 MPag). The molar ratio of hydrogen to hydrocarbon in the reactor stream can generally be between about 0.1 and about 10, alternatively from about 0.5 to about 5.0, or alternatively from about 1:1 to about 3:1. The liquid hourly space velocity (LHSV) for the hydrocarbon feed over the aromatization catalyst can be from about 0.5 to about 20, or alternatively from about 0.50 to about 5.0, based on the catalyst in the reaction zone.

In an aspect, the reactors 204, 208, 212, 216, 220, 224 each contain a catalyst for carrying out a reforming process. As will be appreciated by one of skill in the art, and with the help of this disclosure, a suitable reforming catalyst is capable of converting at least a portion of non-aromatic hydrocarbons (e.g., aliphatic hydrocarbons, alicyclic hydrocarbons, naphthenic hydrocarbons) in a hydrocarbon stream to aromatic hydrocarbons. Any catalyst capable of carrying out a reforming reaction can be used alone or in combination with additional catalytic materials in the reactors. Suitable catalysts can include acidic or non-acidic catalysts. In an aspect, the catalyst is a non-acidic catalyst. A suitable non-acidic catalyst can comprise a non-acidic zeolite support, at least one group VIII metal, and one or more halides. Suitable halides include chloride, fluoride, bromide, iodide, or combinations thereof. Suitable Group VIII metals include iron, cobalt, nickel, ruthenium, rhodium, palladium, osmium, iridium, platinum, or combinations thereof. Non-limiting examples of catalysts suitable for use with the catalytic reactor systems disclosed herein are AROMAX® Catalysts available from the Chevron Phillips Chemical Company LP of The Woodlands, Tex., and those discussed in U.S. Pat. Nos. 6,812,180; 7,153,801 and 9,085,736; each of which is incorporated by reference herein in its entirety.

Supports for reforming catalysts can generally include any inorganic oxide. These inorganic oxides can include bound large pore aluminosilicates (zeolites), amorphous inorganic oxides, and the like, or combinations thereof. Large pore aluminosilicates can include, but are not limited to, L-zeolite, Y-zeolite, mordenite, omega zeolite, beta zeolite, and the like, or combinations thereof. Amorphous inorganic oxides can include, but are not limited to, aluminum oxide, silicon oxide, and titania. Suitable bonding agents for the inorganic oxides can include, but are not limited to, silica, alumina, clays, titania, magnesium oxide, and the like, or combinations thereof.

Zeolite materials, both natural and synthetic, are known to have catalytic properties for many hydrocarbon processes. Zeolites typically are ordered porous crystalline aluminosilicates having structure with cavities and channels interconnected by channels. The cavities and channels throughout the crystalline material generally can be of a size to allow selective separation of hydrocarbons.

The term "zeolite" generally refers to a particular group of hydrated, crystalline metal aluminosilicates. These zeolites exhibit a network of $SiO_4$ and $AlO_4$ tetrahedra in which aluminum and silicon atoms are crosslinked in a three-dimensional framework by sharing oxygen atoms. In the framework, the ratio of oxygen atoms to the total of aluminum and silicon atoms can be equal to about 2. The framework exhibits a negative electrovalence that typically is balanced by the inclusion of cations within the crystal such as metals, alkali metals, alkaline earth metals, or hydrogen.

L-type zeolite catalysts are a sub-group of zeolitic catalysts. Typical L-type zeolites contain mole ratios of oxides in accordance with the following formula:

$$M_{2/n}O.Al_2O_3.xSiO_2.yH_2O$$

wherein "M" designates at least one exchangeable cation such as barium, calcium, cerium, lithium, magnesium, potassium, sodium, strontium, and zinc, as well as non-metallic cations like hydronium and ammonium ions which can be replaced by other exchangeable cations without causing a substantial alteration of the basic crystal structure of the L-type zeolite. The "n" in the formula represents the valence of "M", "x" is 2 or greater; and "y" is the number of water molecules contained in the channels or interconnected voids with the zeolite. Bound potassium L-type zeolites, or KL zeolites, have been found to be particularly desirable. The term "KL zeolite" as used herein refers to L-type zeolites in which the principal cation M incorporated in the zeolite is potassium. A KL zeolite can be cation-exchanged or impregnated with another metal and one or more halides to produce a platinum-impregnated, halided zeolite or a KL supported Pt-halide zeolite catalyst.

In an aspect, the at least one Group VIII metal is platinum. In another aspect, the at least one Group VIII metal is platinum and gold. In an aspect, the at least one Group VIII metal is platinum and rhenium. The platinum and optionally one or more halides can be added to the zeolite support by any suitable method, for example via impregnation with a solution of a platinum-containing compound and one or more halide-containing compounds. For example, the platinum-containing compound can be any decomposable platinum-containing compound. Examples of such compounds include, but are not limited to, ammonium tetrachloroplatinate, chloroplatinic acid, diammineplatinum (II) nitrite, bis-(ethylenediamine)platinum (II) chloride, platinum (II) acetylacetonate, dichlorodiammine platinum, platinum (II) chloride, tetraammineplatinum (II) hydroxide, tetraammineplatinum chloride, and tetraammineplatinum (II) nitrate.

In an aspect, the catalyst can be a large pore zeolite support with a platinum-containing compound and at least one ammonium halide compound. The ammonium halide compound can comprise one or more compounds represented by the formula $N(R)_4X$, where X is a halide and where R represents a hydrogen or a substituted or unsubstituted carbon chain molecule having 1-20 carbons, wherein each R can be the same or different. In an aspect, R is selected from the group consisting of methyl, ethyl, propyl, butyl, and combinations thereof, more specifically methyl. Examples of suitable ammonium compounds represented by the formula $N(R)_4X$ include ammonium chloride, ammonium fluoride, and tetraalkylammonium halides such as tetramethylammonium chloride, tetramethylammonium fluoride, tetraethylammonium chloride, tetraethylammonium fluoride, tetrapropylammonium chloride, tetrapropylammonium fluoride, tetrabutylammonium chloride, tetrabutylammonium fluoride, methyltriethylammonium chloride, methyltriethylammonium fluoride, and combinations thereof.

The organic ammonium halide compound can comprise at least one acid halide and at least one ammonium hydroxide represented by the formula $N(R')_4OH$, where R' is hydrogen or a substituted or unsubstituted carbon chain molecule having 1-20 carbon atoms, wherein each R' may be the same or different. In an aspect, R' can be selected from the group consisting of methyl, ethyl, propyl, butyl, and combinations thereof, more specifically methyl. Examples of suitable ammonium hydroxide represented by the formula $N(R')_4OH$ include ammonium hydroxide, tetraalkylammonium hydroxides such as tetramethylammonium hydroxide, tetraethylammonium hydroxide, tetrapropylammonium hydroxide, tetrabutylammonium hydroxide, and combinations thereof. Examples of suitable acid halides include HCl, HF, HBr, HI, or combinations thereof.

In some aspects, the organic ammonium halide compound can comprise (a) a compound represented by the formula $N(R)_4X$, where X is a halide and where R represents a hydrogen or a substituted or unsubstituted carbon chain molecule having 1-20 carbons, wherein each R may be the same or different; and (b) at least one acid halide and at least one ammonium hydroxide represented by the formula $N(R')_4OH$, where R' is hydrogen or a substituted or unsubstituted carbon chain molecule having 1-20 carbon atoms, wherein each R' may be the same or different.

The halide-containing compound may further comprise an ammonium halide such as ammonium chloride, ammonium fluoride, or both in various combinations with the organic ammonium halide compounds described previously. More specifically, ammonium chloride, ammonium fluoride, or both may be used with (a) a compound represented by the formula $N(R)_4X$, as described previously, a compound represented by the formula $N(R)_4X$, where X is a halide and where R represents a hydrogen or a substituted or unsubstituted carbon chain molecule having 1-20 carbons, wherein each R may be the same or different; (b) as described previously, at least one acid halide and at least one organic ammonium hydroxide represented by the formula $N(R')_4OH$, where R' is a substituted or unsubstituted carbon chain molecule having 1-20 carbon atoms, wherein each R' may be the same or different; or (c) both (a) and (b). For example, a first fluoride- or chloride-containing compound can be introduced as a tetraalkylammonium halide with a second fluoride- or chloride-containing compound introduced as an ammonium halide. In an aspect, tetraalkylammonium chloride is used with ammonium fluoride.

In an aspect, the process for a catalytic reforming system, such as catalytic reforming system 1000, 2000, 3000 as illustrated in FIGS. 1-3, can comprise introducing the cooled reactor effluent stream 116 to the recycle gas section 300. The recycle gas section 300 can generally comprise a plurality of separators, such as separators 302, 308, 312, 322, 328; a plurality of compressors, such as compressors 304, 314, 324; and a plurality of heat exchangers, such as heat exchangers 306, 316, 326. In some aspects, the recycle gas section 300 can comprise a first separator 302, a first compressor 304, a first heat exchanger 306, a second separator 308, a third separator 312, a second compressor 314, a second heat exchanger 316, a fourth separator 322, a third compressor 324, a third heat exchanger 326, and a fifth separator 328.

In an aspect, the process for a catalytic reforming system, such as catalytic reforming system 1000, 2000, 3000 as illustrated in FIGS. 1-3, can comprise introducing the cooled reactor effluent stream 116 to the recycle gas section 300 to produce a recycle gas stream 307, a fifth gas stream 327, and a liquid product stream 330. Generally, the recycle gas section 300 can separate gas products comprising hydrogen (e.g., recycle gas stream 307, fifth gas stream 327) that can be recycled back to the reforming reactor section 200 from liquid products comprising aromatic hydrocarbons, such as benzene (e.g., liquid product stream 330).

Reactor effluent stream 114 can be cooled, for example in the first feed stream heat exchanger 104 and the second feed stream heat exchanger 110, as disclosed herein, to produce the cooled reactor effluent stream 116. Cooling the reactor effluent stream can promote the condensation of aromatic hydrocarbons and enable subsequent removal of aromatic hydrocarbons (e.g., liquid hydrocarbons, liquid aromatic hydrocarbons) from the reactor effluent stream. As will be appreciated by one of skill in the art, and with the help of this disclosure, the composition of the reactor effluent stream is not affected by cooling it, and as such the composition of the cooled reactor effluent stream is the same as the composition of the reactor effluent stream, although some of the components (e.g., aromatic hydrocarbons) might change the phase they are present in, for example a component might change from a gas phase in the reactor effluent stream to a liquid phase in the cooled reactor effluent stream.

In an aspect, and as illustrated in FIGS. 1-3, the cooled reactor effluent stream 116 can be introduced to the first separator 302 to produce a first gas stream 301 and a first liquid stream 303. The first liquid stream 303 can comprise aromatization reaction products (e.g., aromatic compounds such as benzene, and non-aromatic compounds) from aromatization reactors of the reforming reactor section 200, in addition to any unreacted feed and other hydrocarbon compounds or byproducts. The first liquid stream 303 can be further sent to a purification-extraction process for enhancing the aromatics (e.g., benzene) content, as will be described in more detail later herein. Hydrogen-containing gas stream separation processes and the purification-extraction processes for benzene are well known in the art and are described in numerous patents, including U.S. Pat. Nos. 5,401,386; 5,877,367; and 6,004,452; each of which is incorporated by reference herein in its entirety.

Separators 302, 308, 312, 322, 328 can comprise any suitable vapor-liquid separators that can separate condensed aromatic hydrocarbons from a reactor effluent stream, such as the cooled reactor effluent stream 116. Non-limiting examples of vapor-liquid separators suitable for use in the present disclosure include gravity separators, centrifugal separators, filter vane separators, mist eliminator pads, liquid/gas coalescers, flash drums, knock-out drums, and the like, or combinations thereof. The separators 302, 308, 312, 322, 328 can comprise impingement barriers (e.g., mist eliminator pads, plates, mesh screen, grating) that can use inertial impaction to separate condensed hydrocarbons from a gas stream. A separator feed stream (e.g., cooled reactor effluent stream 116) can follow a tortuous path around these impingement barriers, while liquid droplets (e.g., hydrocarbon liquid droplets) tend to go in straighter paths, impacting these impingement barriers, thereby losing velocity, coalescing, or both, which eventually leads to the liquid droplets falling to a bottom of a separation vessel, such as the separators 302, 308, 312, 322, 328.

The first gas stream 301 can be collected as an overhead stream at a top of the first separator 301. The first gas stream 301 can comprise aromatic hydrocarbons in an amount of less than about 25 mol %, alternatively less than about 20 mol %, or alternatively less than about 15 mol %. The first liquid stream 303 can be collected as a bottoms stream at a bottom of the first separator 302. The first liquid stream 303 can comprise aromatic hydrocarbons (e.g., benzene) in an amount of equal to or greater than about 1 mol %, alternatively equal to or greater than about 5 mol %, or alternatively equal to or greater than about 10 mol %.

The first gas stream 301 can be introduced to the first compressor 304 to produce a first compressed gas stream 305. Generally, the compressors 304, 314, 324 can comprise any suitable gas compressor that can increase the pressure of a gas stream as required by the process. Generally, a gas compressor is a mechanical device that can increase the pressure of a gas by reducing its volume. Non-limiting examples of gas compressors suitable for use in the present disclosure include a screw compressor, a rotary-screw compressor, an oil-free rotary-screw compressor, an oil-injected rotary-screw compressor, a centrifugal compressor, a reciprocating compressor, an axial-flow compressor, and the like, or combinations thereof.

As will be appreciated by one of skill in the art, and with the help of this disclosure, the composition of the first gas stream is not affected by compressing it, and as such the composition of an effluent stream from the first compressor 304 (e.g., the first compressed gas stream 305) is the same as the composition of the first gas stream 301. Further, as will be appreciated by one of skill in the art, and with the help of this disclosure, compressing the first gas stream 301 enables the aromatic hydrocarbons in the first gas stream 301 to condense at a higher temperature than without the compressing step, which means that a subsequent cooling step will have to cool the compressed gas less to achieve hydrocarbon condensation.

The first compressed gas stream 305 (e.g., effluent stream flowing from the first compressor 304) can be further cooled in the first heat exchanger 306 to promote the condensation of aromatic hydrocarbons and enable subsequent removal of aromatic hydrocarbons. The heat exchangers 306, 316, 326 can be any suitable heat exchangers that can lower the temperature of the compressed gas streams flowing from compressors 304, 314, 324, as required by the process.

In some aspects, and as illustrated in FIG. 2, a portion 305a of the first compressed gas stream 305 (e.g., effluent stream 305a) can be combined with the recycle gas stream 352 to form the aromatized recycle stream 353. The effluent stream 305a can comprise aromatic hydrocarbons in an amount of from about 2 mol % to about 25 mol %, alternatively from about 4 mol % to about 20 mol %, or alternatively from about 5 mol % to about 15 mol %. In such aspects, the effluent stream 305a can supply a portion of the necessary recycle hydrogen, and as such less recycle gas stream 352 could be recycled to the hydrocarbon feed stream.

In other aspects, and as illustrated in FIG. 3, a portion 305a of the first compressed gas stream 305 (e.g., effluent stream 305a) can be combined with the heated stream 357 to form the heated stream 107. In such aspects, the effluent stream 305a can supply a portion of the necessary recycle hydrogen, and as such less recycle gas stream 352 could be recycled to the hydrocarbon feed stream.

The cooled first compressed gas stream can be introduced to the second separator 308 to produce a second gas stream 307 and a second liquid stream 309. The second gas stream 307 can be collected as an overhead stream at a top of the second separator 308. The second liquid stream 309 can be collected as a bottoms stream at a bottom of the second separator 308.

The second liquid stream 309 can comprise aromatization reaction products (e.g., aromatic compounds such as benzene, and non-aromatic compounds), and, in some aspects, can be recycled to the first separator 302, for example via stream 116, to enhance the recovery of aromatic hydrocarbons. In other aspects, the second liquid stream 309 can be combined with the first liquid stream 303 to form the liquid product stream 330.

The second gas stream 307 can comprise hydrogen. In an aspect, hydrogen can be present in the second gas stream 307 in an amount of equal to or greater than about 60 mol %, alternatively equal to or greater than about 65 mol %, or alternatively equal to or greater than about 70 mol %.

A first portion 307a of the second gas stream 307 (e.g., net gas) can be introduced to the third separator 312 to produce a third gas stream 311 and a third liquid stream 313. The third gas stream 311 can be collected as an overhead stream at a top of the third separator 312. The third liquid stream 313 can be collected as a bottoms stream at a bottom of the third separator 312.

A second portion 307b of the second gas stream 307 (e.g., recycle gas) can be fed to the drier 350 to separate the water and form the recycle gas stream 352, wherein the recycle gas stream 352 comprises hydrogen. The drier 350 can be any suitable drier configured to remove at least a portion of the water from a gas stream (e.g., second gas stream 307) and produce a dried gas stream (e.g., recycle gas stream 352). For example, the drier 350 can comprise a desiccant, such as calcium chloride, that can separate (e.g., absorb) at least a portion of the water from a gas stream. The drier 350 can have any suitable configuration, wherein the drier 350 can employ one or more drier units, wherein the one or more drier units can be connected in series, in parallel, or both in series and in parallel. In an aspect, the recycle gas stream 352 can be substantially free of water. In an aspect, the recycle gas stream 352 can comprise water in an amount of less than about 1 wt. %, alternatively less than about 0.1 wt. %, alternatively less than about 0.01 wt. %, or alternatively less than about 0.001 wt. %, based on the total weight of the recycle gas stream 352. The recycle gas stream 352 is a gas stream comprising hydrogen (e.g., in an amount of equal to or greater than about 1 mol %) that has been separated from liquid hydrocarbons (e.g., liquid aromatic hydrocarbons), such as a liquid product stream 330, in the recycle gas section 300.

In an aspect, the second gas stream 307 (e.g., the first portion 307a and the second portion 307b of the second gas stream) can be fed to the drier 350 to separate the water and form the recycle gas stream 352, wherein the recycle gas stream 352 comprises hydrogen. For clarity purposes, the configuration where the entire second gas stream 307 is fed to the drier 350 is not depicted in the Figures.

The third liquid stream 313 can comprise aromatization reaction products (e.g., aromatic compounds such as benzene, and non-aromatic compounds), and, in some aspects, can be recycled to the first separator 302, for example via stream 116, to enhance the recovery of aromatic hydrocarbons. In some configurations, the third liquid stream 313 can be combined with the second liquid stream 309 prior to recycling to the first separator 302. In other aspects, the third liquid stream 313 can be (1) combined with the first liquid stream 303 to form the liquid product stream 330; (2) recycled to the first separator 302, the second separator 308, or both separators 302 and 308; or (3) both (1) and (2).

The third gas stream 311 can be further compressed and cooled in the second compressor 314 and the second heat exchanger 316, respectively, and then can be introduced to the fourth separator 322 to produce a fourth gas stream 321 and a fourth liquid stream 323. The fourth gas stream 321 can be collected as an overhead stream at a top of the fourth separator 322. The fourth liquid stream 323 can be collected as a bottoms stream at a bottom of the fourth separator 322. The fourth liquid stream 323 can be combined with the first liquid stream 303 to form the liquid product stream 330. In some aspects, the fourth liquid stream 323 can be (1) combined with the first liquid stream 303 to form the liquid product stream 330; (2) recycled to one or more of the separators 302, 308, and 312; or (3) both (1) and (2).

The fourth gas stream 321 can be further compressed and cooled in the third compressor 324 and the third heat exchanger 326, respectively, and then can be introduced to the fifth separator 328 to produce a fifth gas stream 327 and a fifth liquid stream 329. The fifth gas stream 327 can be collected as an overhead stream at a top of the fifth separator 328. The fifth liquid stream 329 can be collected as a bottoms stream at a bottom of the fifth separator 328. In some aspects, the fifth liquid stream 329 can be combined with the first liquid stream 303, the fourth liquid stream 323, or both to form the liquid product stream 330. In other aspects, the fifth liquid stream 329 can be recycled to one or more of the separators 302, 308, 312, and 322 to enhance the recovery of aromatic hydrocarbons. For example, the fifth liquid stream 329 can be recycled to the fourth separator 322.

The fifth gas stream 327 can comprise hydrogen in an amount of equal to or greater than about 70 mol %, alternatively equal to or greater than about 80 mol %, alternatively equal to or greater than about 90 mol %, or alternatively equal to or greater than about 95 mol %. The fifth gas stream 327 can be used for any suitable application that requires a hydrogen containing gas stream, such as a hydrogenation process. The fifth gas stream 327 can be further subjected to any suitable purification steps, for example a halogen removal step, as required by any specific applications employing the fifth gas stream 327. In some aspects, at least a portion of the fifth gas stream 327 can be recycled to the reforming reactor section 200. For example, at least a portion of the fifth gas stream 327 can be fed to the drier 350, e.g., via stream 307b.

The liquid product stream 330 can comprise benzene in an amount of equal to or greater than about 20 wt. %, alternatively equal to or greater than about 25 wt. %, or alternatively equal to or greater than about 35 wt. %, based on the total weight of the liquid product stream 330.

The liquid product stream 330 can be further subjected to a purification process (e.g., purification-extraction process) to produce a benzene product, wherein the benzene product comprises benzene in an amount of equal to or greater than about 98 wt. %, alternatively equal to or greater than about 99 wt. %, alternatively equal to or greater than about 99.8 wt. %, based on the total weight of the benzene product. The benzene product can be sold or otherwise used as desired.

The purification process for producing the benzene product can comprise introducing the liquid product stream 330 to an extraction unit to produce an aromatic extract stream (e.g., benzene product) and a non-aromatic stream. The extraction unit can comprise any suitable extraction unit for separating aromatics from non-aromatics. Generally, the extraction can be either a liquid/liquid extraction (for example, using sulfolane as the solvent) or an extractive distillation. Extractive distillation technology can be used for recovering a high purity benzene product from the liquid product stream 330 by using N-methyl pyrrolidone as a solvent. Another extractive distillation process can employ N-substituted morpholines as the extractive distillation solvent.

An extraction unit for producing the benzene product can comprise an extractive distillation unit using a N-formylmorpholine solvent. Such a unit could employ an extractive distillation column and a stripper column. The extractive distillation column can contact the liquid product stream 330 with the N-formylmorpholine solvent, thus suppressing the boiling point of the aromatics and allowing the non-aromatics to be taken overhead. The stripper column can then separate the remaining aromatics from the N-formylmorpholine solvent using simple distillation. The non-aromatic stream recovered from the extraction process can be recycled to the reforming reactor section 200. In an aspect, the non-aromatic stream can be dried prior to recycling to the reforming reactor section 200.

In an aspect, the process for a catalytic reforming system, such as catalytic reforming system 4000 as illustrated in FIG. 4, can comprise (a) feeding the hydrocarbon feed stream 101 comprising an aliphatic hydrocarbon, a sulfur-containing compound, and water to the drier 102 to separate the water and form the dried hydrocarbon feed stream 103, wherein the dried hydrocarbon feed stream 103 comprises the aliphatic hydrocarbon and the sulfur-containing compound; (b) combining the dried hydrocarbon feed stream 103 with the recycle gas stream 352 to form the inlet stream 355 to the first feed stream heat exchanger 104, wherein the recycle gas stream 352 comprises hydrogen, and wherein the inlet stream 355 comprises the aliphatic hydrocarbon, the sulfur-containing compound, and hydrogen; (c) heating the inlet stream 355 in the first feed stream heat exchanger 104 by exchanging heat with the reactor effluent stream 115 to form the heated stream 357 and the cooled reactor effluent stream 116, wherein a temperature of the heated stream 357 is higher than a temperature of the inlet stream 355, and wherein a temperature of the cooled reactor effluent stream 116 is lower than a temperature of the reactor effluent stream 115; (d) feeding the heated stream 357 to the sulfur removal system 108 to produce the reduced sulfur stream 109, wherein the reduced sulfur stream 109 comprises the aliphatic hydrocarbon and hydrogen; (e) heating the reduced sulfur stream 109 in the second feed stream heat exchanger 110 by exchanging heat with a first portion 114a of the reactor effluent stream 114 to form the catalytic reforming reactor feed stream 113 and a reactor effluent stream 115a, wherein a temperature of the catalytic reforming reactor feed stream 113 is higher than a temperature of the reduced sulfur stream 109, and wherein a temperature of the reactor effluent stream 115a is lower than a temperature of the reactor effluent stream 114; (f) combining the reactor effluent stream 115a with a second portion 114b of the reactor effluent stream 114 to form the reactor effluent stream 115, wherein a temperature of the reactor effluent stream 115 is greater than a temperature of the reactor effluent stream 115a; (g) introducing the catalytic reforming reactor feed stream 113 to the reforming reactor section 200 to produce the reactor effluent stream 114, wherein at least a portion of the aliphatic hydrocarbon is converted to an aromatic hydrocarbon (e.g., benzene), and wherein the reactor effluent stream 114 comprises the aromatic hydrocarbon and hydrogen; and (h) introducing the cooled reactor effluent stream 116 to the recycle gas section 300 to produce the liquid product stream 330, the recycle gas stream 352, and the fifth gas stream 327, wherein the liquid product stream 330 comprises the aromatic hydrocarbon, and wherein the fifth gas stream 327 comprises hydrogen. Without wishing to be limited by theory, by using only a portion (e.g., 114a) of the reactor effluent stream 114 to provide heat in the second feed stream heat exchanger 110, the rest of the reactor effluent stream 114 (e.g., second portion 114b) can bypass the heat exchanger 110 and provide for a higher temperature of the reactor effluent stream 115, and thus for a higher temperature of the hydrocarbon feed stream heated in the first feed stream heat exchanger 104, thereby enabling for a larger volume of hydrocarbon feed stream to be processed through the sulfur removal system 108 for sulfur removal, such that the hydrocarbon feed stream can be suitable for feeding to the reforming reactor section 200.

The various aspects shown in the Figures can be simplified and may not illustrate common equipment such as heat exchangers, pumps, and compressors; however, a skilled artisan would recognize the disclosed processes and systems may include such equipment commonly used throughout aromatics manufacturing.

According to the present disclosure, the process for a catalytic reforming system, such as catalytic reforming system 1000 as illustrated in FIG. 1, can comprise (a) combining the aromatic-containing stream 150 with the hydrocarbon feed stream 101 to form the aromatized hydrocarbon feed stream 151, wherein the aromatic-containing stream 150 comprises a first aromatic hydrocarbon, wherein the hydrocarbon feed stream 101 comprises a first aliphatic hydrocarbon, a sulfur-containing compound, and water, and wherein the aromatized hydrocarbon feed stream 151 comprises the first aliphatic hydrocarbon, the first aromatic hydrocarbon, the sulfur-containing compound, and water; (b) feeding the aromatized hydrocarbon feed stream 151 to the drier 102 to separate the water and form the dried hydrocarbon feed stream 153, wherein the dried hydrocarbon feed stream 153 comprises the first aliphatic hydrocarbon, the first aromatic hydrocarbon, and the sulfur-containing compound; (c) combining the dried hydrocarbon feed stream 153 with the recycle gas stream 352 to form the inlet stream 354 to the first feed stream heat exchanger 104, wherein the recycle gas stream 352 comprises hydrogen, and wherein the inlet stream 354 comprises the first aliphatic hydrocarbon, the first aromatic hydrocarbon, the sulfur-containing compound, and hydrogen; (d) heating the inlet stream 354 in the first feed stream heat exchanger 104 by exchanging heat with the reactor effluent stream 115 to form the heated stream 107 and the cooled reactor effluent stream 116, wherein a temperature of the heated stream 107 is higher than a temperature of the inlet stream 354, and wherein a temperature of the cooled reactor effluent stream 116 is lower than a temperature of the reactor effluent stream 115; (e) feeding the heated stream 107 to the sulfur removal system 108 to produce the reduced sulfur stream 109, wherein at least a portion of the first aromatic hydrocarbon is converted via an exothermic hydrogenation reaction to a second aliphatic hydrocarbon, wherein the reduced sulfur stream 109 comprises the first aliphatic hydrocarbon, the second aliphatic hydrocarbon, and hydrogen, and wherein a temperature of the reduced sulfur stream 109 is greater than a temperature of the heated stream 107; (f) heating the reduced sulfur stream 109 in the second feed stream heat exchanger 110 by exchanging heat with a first portion 114a of the reactor effluent stream 114 to form the catalytic reforming reactor feed stream 113 and the reactor effluent stream 115, wherein a temperature of the catalytic reforming reactor feed stream 113 is higher than a temperature of the reduced sulfur stream 109, and wherein a temperature of the reactor effluent stream 115 is lower than a temperature of the reactor effluent stream 114; (g) optionally combining the reactor effluent stream 115 with a second portion 114b of the reactor effluent stream 114 to increase a temperature of the reactor effluent stream 115 prior to exchanging heat in the first feed stream heat exchanger 104 in step (d); (h) introducing the catalytic reforming reactor feed stream 113 to the reforming reactor section 200 to produce the reactor effluent stream 114, wherein at least a portion of the aliphatic hydrocarbons (e.g., first aliphatic hydrocarbon, second aliphatic hydrocarbon) is converted to a second aromatic hydrocarbon (e.g., benzene), and wherein the reactor effluent stream 114 comprises the second aromatic hydrocarbon and hydrogen; and (i) introducing the cooled reactor effluent stream 116 to the recycle gas section 300 to produce the liquid product stream 330, the recycle gas stream 352, and the fifth gas stream 327, wherein the liquid product stream 330 comprises the second aromatic hydrocarbon, and wherein the fifth gas stream 327 comprises hydrogen. In an aspect, a temperature of the aromatized hydrocarbon feed stream 151 is greater than a temperature of the hydrocarbon feed stream 101. In some aspects, the first aromatic hydrocarbon can comprise a portion of the second aromatic hydrocarbon.

According to the present disclosure, the process for a catalytic reforming system, such as catalytic reforming system 2000 as illustrated in FIG. 2, can comprise (a) feeding the hydrocarbon feed stream 101 comprising a first aliphatic hydrocarbon, a sulfur-containing compound, and water to the drier 102 to separate the water and form the dried hydrocarbon feed stream 103, wherein the dried hydrocarbon feed stream 103 comprises the first aliphatic hydrocarbon, and the sulfur-containing compound; (b) combining the dried hydrocarbon feed stream 103 with the aromatized recycle gas stream 353 to form the inlet stream 354 to the first feed stream heat exchanger 104, wherein the aromatized recycle gas stream 353 comprises a first aromatic hydrocarbon and hydrogen, and wherein the inlet stream 354 comprises the first aliphatic hydrocarbon, the first aromatic hydrocarbon, the sulfur-containing compound, and hydrogen; (c) heating the inlet stream 354 in the first feed stream heat exchanger 104 by exchanging heat with the reactor effluent stream 115 to form the heated stream 107 and the cooled reactor effluent stream 116, wherein a temperature of the heated stream 107 is higher than a temperature of the inlet stream 354, and wherein a temperature of the cooled reactor effluent stream 116 is lower than a temperature of the reactor effluent stream 115; (d) feeding the heated stream 107 to the sulfur removal system 108 to produce the reduced sulfur stream 109, wherein at least a portion of the first aromatic hydrocarbon is converted via an exothermic hydrogenation reaction to a second aliphatic hydrocarbon, wherein the reduced sulfur stream 109 comprises the first aliphatic hydrocarbon, the second aliphatic hydrocarbon, and hydrogen, and wherein a temperature of the reduced sulfur stream 109 is greater than a temperature of the heated stream 107; (e) heating the reduced sulfur stream 109 in the second feed stream heat exchanger 110 by exchanging heat with a first portion 114a of the reactor effluent stream 114 to form the catalytic reforming reactor feed stream 113 and the reactor effluent stream 115, wherein a temperature of the catalytic reforming reactor feed stream 113 is higher than a temperature of the reduced sulfur stream 109, and wherein a temperature of the reactor effluent stream 115 is lower than a temperature of the reactor effluent stream 114; (f) optionally combining the reactor effluent stream 115 with a second portion 114b of the reactor effluent stream 114 to increase a temperature of the reactor effluent stream 115 prior to exchanging heat in the first feed stream heat exchanger 104 in step (c); (g) introducing the catalytic reforming reactor feed stream 113 to the reforming reactor section 200 to produce the reactor effluent stream 114, wherein at least a portion of the aliphatic hydrocarbons (e.g., first aliphatic hydrocarbon, second aliphatic hydrocarbon) is converted to a second aromatic hydrocarbon (e.g., benzene), and wherein the reactor effluent stream 114 comprises the second aromatic hydrocarbon and hydrogen; (h) introducing the cooled reactor effluent stream 116 to the recycle gas section 300 to produce the liquid product stream 330, the effluent stream 305a, the recycle gas stream 352, and the fifth gas stream 327, wherein the liquid product stream 330 comprises a first portion of the second aromatic hydrocarbon, wherein the effluent stream 305a comprises a second portion of the second aromatic hydrocarbon, wherein the recycle gas stream 352 comprises hydrogen, and wherein the fifth gas stream 327 comprises hydrogen; and (i) combining the effluent stream 305a with the recycle gas stream 352 to form the aromatized recycle gas stream 353, wherein the first aromatic hydrocarbon comprises the second portion of the second aromatic hydrocarbon. In an aspect, a temperature of the inlet stream 354 is greater than a temperature of the dried hydrocarbon feed stream 103.

According to the present disclosure, the process for a catalytic reforming system, such as catalytic reforming system 3000 as illustrated in FIG. 3, can comprise (a) feeding the hydrocarbon feed stream 101 comprising a first aliphatic hydrocarbon, a sulfur-containing compound, and water to the drier 102 to separate the water and form the dried hydrocarbon feed stream 103, wherein the dried hydrocarbon feed stream 103 comprises the first aliphatic hydrocarbon, and the sulfur-containing compound; (b) combining the dried hydrocarbon feed stream 103 with the recycle gas stream 352 to form the inlet stream 355 to the first feed stream heat exchanger 104, wherein the recycle gas stream 352 comprises hydrogen, and wherein the inlet stream 355 comprises the first aliphatic hydrocarbon, the sulfur-containing compound, and hydrogen; (c) heating the inlet stream 355 in the first feed stream heat exchanger 104 by exchanging heat with the reactor effluent stream 115 to form the heated stream 357 and the cooled reactor effluent stream 116, wherein a temperature of the heated stream 357 is higher than a temperature of the inlet stream 355, and wherein a temperature of the cooled reactor effluent stream 116 is lower than a temperature of the reactor effluent stream 115; (d) combining the heated stream 357 with the effluent stream 305a to form the heated stream 107, wherein the effluent stream 305a comprises a first aromatic hydrocarbon, and wherein the heated stream 107 comprises the first aliphatic hydrocarbon, the first aromatic hydrocarbon, the sulfur-containing compound, and hydrogen; (e) feeding the heated stream 107 to the sulfur removal system 108 to produce the reduced sulfur stream 109, wherein at least a portion of the first aromatic hydrocarbon is converted via an exothermic hydrogenation reaction to a second aliphatic hydrocarbon, wherein the reduced sulfur stream 109 comprises the first aliphatic hydrocarbon, the second aliphatic hydrocarbon, and hydrogen, and wherein a temperature of the reduced sulfur stream 109 is greater than a temperature of the heated stream 107; (f) heating the reduced sulfur stream 109 in the second feed stream heat exchanger 110 by exchanging heat with a first portion 114a of the reactor effluent stream 114 to form the catalytic reforming reactor feed stream 113 and the reactor effluent stream 115, wherein a temperature of the catalytic reforming reactor feed stream 113 is higher than a temperature of the reduced sulfur stream 109, and wherein a temperature of the reactor effluent stream 115 is lower than a temperature of the reactor effluent stream 114; (g) optionally combining the reactor effluent stream 115 with a second portion 114b of the reactor effluent stream 114 to increase a temperature of the reactor effluent stream 115 prior to exchanging heat in the first feed stream heat exchanger 104 in step (c); (h) introducing the catalytic reforming reactor feed stream 113 to the reforming reactor section 200 to produce the reactor effluent stream 114, wherein at least a portion of the aliphatic hydrocarbons (e.g., first aliphatic hydrocarbon, second aliphatic hydrocarbon) is converted to a second aromatic hydrocarbon (e.g., benzene), and wherein the reactor effluent stream 114 comprises the second aromatic hydrocarbon and hydrogen; and (i) introducing the cooled reactor effluent stream 116 to the recycle gas section 300 to produce the liquid product stream 330, the effluent stream 305a, the recycle gas stream 352, and the fifth gas stream 327, wherein the liquid product stream 330 comprises a first portion of the second aromatic hydrocarbon, wherein the effluent stream 305a comprises a second portion of the second aromatic hydrocarbon, and wherein the fifth gas stream 327 comprises hydrogen. The first aromatic hydrocarbon comprises the second portion of the second aromatic hydrocarbon. In an aspect, a temperature of the heated stream 107 is greater than a temperature of the heated stream 357.

In an aspect, a catalytic reforming system, such as catalytic reforming system 1000 as illustrated in FIG. 1, can comprise a first stream (e.g., aromatic-containing stream 150) comprising an aromatic hydrocarbon; a second stream (e.g., hydrocarbon feed stream 101) comprising a hydrocarbon feed stream, wherein the hydrocarbon feed stream comprises a sulfur-containing compound, an aliphatic hydrocarbon, and water; a combined stream (e.g., aromatized hydrocarbon feed stream 151) formed by combining the first stream and the second stream, wherein the combined stream comprises the aromatic hydrocarbon; a drier 102, wherein the combined stream is fed to the drier 102; a sulfur removal system 108 in fluid communication with the combined stream, wherein the sulfur removal system 108 is configured to convert the aromatic hydrocarbon to an aliphatic hydrocarbon by exothermic reaction; a first feed stream heat exchanger 104 in fluid communication with the drier 102 and with the sulfur removal system 108; a second feed stream heat exchanger 110 in fluid communication with the sulfur removal system 108; a reforming reactor section 200 comprising a plurality of reactor-furnace pairs connected in series, wherein a first pair of the plurality of reactor-furnace pairs is in fluid communication with the second feed stream heat exchanger 110. In some aspects, the first stream can comprise a portion of an effluent stream flowing from a donor reactor of the plurality of reactor-furnace pairs in the reforming reactor section 200. The donor reactor can be a last reactor of the plurality of reactor-furnace pairs, such as reactor 224. The catalytic reforming system 1000 can further comprise an effluent stream (e.g., reactor effluent stream 114) of a donor reactor of the plurality of reactor-furnace pairs in the reforming reactor section 200; wherein the effluent stream is in fluid communication with the second feed stream heat exchanger 110 and with the first feed stream heat exchanger 104.

In an aspect, a catalytic reforming system, such as catalytic reforming system 2000 as illustrated in FIG. 2, can comprise a first stream (e.g., effluent stream 305a) comprising an aromatic hydrocarbon; a second stream (e.g., recycle gas stream 352) comprising hydrogen; a combined stream (e.g., aromatized recycle stream 353) formed by combining the first stream and the second stream, wherein the combined stream comprises the aromatic hydrocarbon; a sulfur removal system 108 in fluid communication with the combined stream, wherein the sulfur removal system 108 is configured to convert the aromatic hydrocarbon to an aliphatic hydrocarbon by exothermic reaction; a first feed stream heat exchanger 104 in fluid communication with the sulfur removal system 108; a dried hydrocarbon feed stream 103 in fluid communication with the first feed stream heat exchanger 104, wherein the combined stream is an aromatized recycle stream 353 which is in fluid communication with the dried hydrocarbon feed stream 103; a second feed stream heat exchanger 110 in fluid communication with the sulfur removal system 108; a reforming reactor section 200 comprising a plurality of reactor-furnace pairs connected in series, wherein a first pair of the plurality of reactor-furnace pairs is in fluid communication with the second feed stream heat exchanger 110; a recycle gas section 300 comprising a plurality of compressors (e.g., 304, 314, 324); wherein the first stream comprises at least a portion 305a of an effluent stream 305 of a first compressor 304 of the plurality of compressors, and wherein the second stream is a recycle gas stream 352 comprising hydrogen separated from liquid hydrocarbons in the recycle gas section 300 of the catalytic reforming system 2000. In such aspect, a temperature of the first stream is higher than a temperature of the second stream. The temperature of the first stream can be from about 300° F. (about 149° C.) to about 400° F. (about 204° C.); and the temperature of the second stream from about 41° F. (about 5° C.) to about 212° F. (about 100° C.). The catalytic reforming system 2000 can further comprise an effluent stream (e.g., reactor effluent stream 114) of a donor reactor of the plurality of reactor-furnace pairs in the reforming reactor section 200; wherein the effluent stream is in fluid communication with the second feed stream heat exchanger 110 and with the first feed stream heat exchanger 104.

In an aspect, a catalytic reforming system, such as catalytic reforming system 3000 as illustrated in FIG. 3, can comprise a first stream (e.g., effluent stream 305a) comprising an aromatic hydrocarbon; a second stream (e.g., heated stream 357) comprising hydrogen; a combined stream (e.g., heated stream 107) formed by combining the first stream and the second stream, wherein the combined stream comprises the aromatic hydrocarbon; a sulfur removal system 108 in fluid communication with the combined stream, wherein the sulfur removal system 108 is configured to convert the aromatic hydrocarbon to an aliphatic hydrocarbon by exothermic reaction; a first feed stream heat exchanger 104 in fluid communication with the sulfur removal system 108; a second feed stream heat exchanger 110 in fluid communication with the sulfur removal system 108; a reforming reactor section 200 comprising a plurality of reactor-furnace pairs connected in series, wherein a first pair of the plurality of reactor-furnace pairs is in fluid communication with the second feed stream heat exchanger 110; a recycle gas section 300 comprising a plurality of compressors (e.g., 304, 314, 324); wherein the first stream comprises at least a portion 305a of an effluent stream 305 of a first compressor 304 of the plurality of compressors, and wherein the second stream is a heated stream 357 flowing from the first feed stream heat exchanger 104. The catalytic reforming system 3000 can further comprise an effluent stream (e.g., reactor effluent stream 114) of a donor reactor of the plurality of reactor-furnace pairs in the reforming reactor section 200; wherein the effluent stream is in fluid communication with the second feed stream heat exchanger 110 and with the first feed stream heat exchanger 104.

One or more of the disclosed systems (e.g., catalytic reforming system 1000, catalytic reforming system 2000, catalytic reforming system 3000, catalytic reforming system 4000), processes, or both can advantageously display improvements in one or more system characteristics, process characteristics, or both when compared to otherwise similar systems, processes, or both used in conventional catalytic reforming processes. The process for a catalytic reforming system as disclosed herein can advantageously allow for increasing the volume of hydrocarbon feed stream (e.g., hydrocarbon feed stream 101) that can be reformed (e.g., aromatized) in the catalytic reforming system, for example by increasing an operating temperature of a sulfur removal system (e.g., sulfur removal system 108). Such increase in the operating temperature of the sulfur removal system can be accomplished by introducing an aromatic hydrocarbon to the sulfur removal system, wherein the aromatic hydrocarbon can undergo an exothermic hydrogenation reaction to an aliphatic hydrocarbon in the sulfur removal system. In some aspects, the aromatic hydrocarbon can be introduced to the hydrocarbon feed stream via an aromatic-containing stream with an elevated temperature (as compared to a temperature of the hydrocarbon feed stream), thereby advantageously causing the hydrocarbon feed stream entering the sulfur removal system to have an increased temperature.

The process for a catalytic reforming system as disclosed herein can advantageously allow for increasing aromatic hydrocarbon (e.g., benzene) production capacity, for example by enabling the removal of undesirable sulfur containing species from an increased volume of hydrocarbon feed stream. Additional advantages of the systems, processes, or both for catalytic reforming as disclosed herein can be apparent to one of skill in the art viewing this disclosure.

The present disclosure is further illustrated by the following examples, which are not to be construed in any way as imposing limitations upon the scope thereof. On the contrary, it is to be clearly understood that resort can be had to various other aspects, embodiments, modifications, and equivalents thereof which, after reading the description herein, can be suggest to one of ordinary skill in the art without departing from the spirit of the present invention or the scope of the appended claims.

EXAMPLES

The disclosure having been generally described, the following examples demonstrate the practice and advantages thereof. It is understood that the examples are given by way of illustration and are not intended to limit the specification of the claims to follow in any manner.

Example 1

Figure 5:
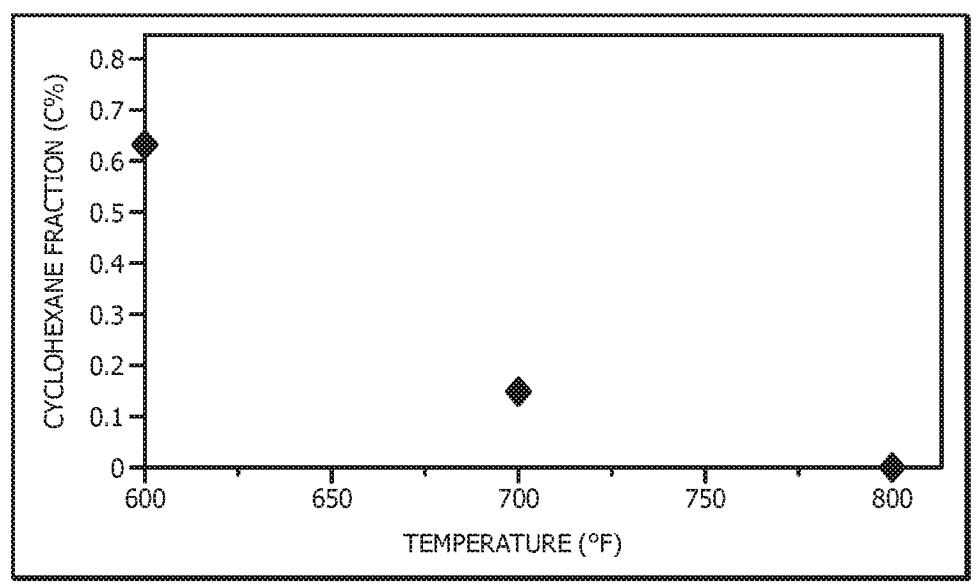
FIG. 5 displays a graph of cyclohexane molar fraction variation with temperature in a mixture of cyclohexane, benzene, and hydrogen.

The molar fraction distribution of cyclohexane in a cyclohexane/benzene mixture was investigated for temperatures between 600° F. (316° C.) and 800° F. (427° C.). The distribution of cyclohexane in a cyclohexane/benzene mixture was investigated with a Grayson model on Aspen Plus, having a starting molar ratio of cyclohexane:benzene:hydrogen of 1:1:2, at a pressure of 100 psig (0.689 MPag), and the data are displayed in FIG. 5. The data indicate that cyclohexane is thermodynamically favored at lower temperatures. FIG. 5 demonstrates that cyclohexane is favored over benzene at sulfur removal system (e.g., sulfur removal system 108 in FIGS. 1-4) operating temperatures (e.g., about 500° F. (260° C.) to about 600° F. (316° C.)). The data indicate that aromatics, such as benzene, will readily convert to aliphatics, such as cyclohexane, in the sulfur removal system (e.g., sulfur removal system 108 in FIGS. 1-4). As will be appreciated by one of skill in the art, and with the help of this disclosure, and without wishing to be limited by theory, given that the hydrogenation of aromatics (e.g., benzene to cyclohexane) is exothermic, addition of aromatic species to a reactor operating at conditions disclosed in this example (Example 1) for the sulfur removal system will result in the generation of heat and promote higher temperatures in the reactor. This heat generation can allow for processing of more feed through the sulfur removal system.

Example 2

The recycling of aromatic hydrocarbons to the hydrocarbon feed stream in catalytic reforming systems was investigated by mathematical modeling. The mathematical modeling was conducted using PRO/II Process Engineering v. 9.3.1 steady state, chemical process simulation software (available from Schneider Electric, SimSci). All cases are for a catalytic reforming system producing 30,000 (barrels per day) bbl/d benzene, and the data are shown in Table 1, which displays heating duties for different techniques/modes of transferring heating duties away from the first feed stream heat exchanger 104, furnace 202, or both.

TABLE 1

| | Base Case | Case #1 | Case #2 | Case #3 |
|---|---|---|---|---|
| Recycle Parameter | | 1,000 bbl/d Benzene | 0.5 RR Hot H$_2$/Benzene | 1.4 RR Hot H$_2$/Benzene |
| Heat Exchanger 104 Duty (MMBtu/hr) | 135.5 | 139.8 | 133.0 | 128.6 |
| Heat Exchanger 110 (MMBtu/hr) | 38.61 | 38.16 | 39.17 | 41.14 |
| Furnace 202 Duty (MMBtu/hr) | 57.2 | 56.5 | 56.3 | 54.5 |
| Furnace 206 Duty (MMBtu/hr) | 62.1 | 63.6 | 63.1 | 64.5 |

MMBtu/hr = one million British thermal unit (BTU) per hour; RR = recycle ratio.

A base case was used for reference, for a catalytic reforming system having a configuration similar to the catalytic reforming system 1000 illustrated in FIG. 1, but with no stream 150 being combined with stream 101.

Case #1 corresponds to the catalytic reforming system 1000 illustrated in FIG. 1, wherein the aromatic-containing stream 150 was modeled at a flow volume of 1,000 bbl/d benzene.

Case #2 corresponds to the catalytic reforming system 2000 illustrated in FIG. 2, wherein effluent stream 305a provides for 36% of the total amount of hydrogen recycled into the hydrocarbon feed stream to be treated in the sulfur removal system 108 for the removal of undesirable sulfur species. The total amount of hydrogen recycled into this hydrocarbon feed stream comes from both effluent stream 305a (provides for 36%), and the recycle gas stream 352 (64%).

Case #3 corresponds to a catalytic reforming system having a configuration similar to the catalytic reforming system 2000 illustrated in FIG. 2, but without combining the effluent stream 305a with the recycle gas stream 352, wherein effluent stream 305a provides for 100% of the total amount of hydrogen recycled into the hydrocarbon feed stream to be treated in the sulfur removal system 108 for the removal of undesirable sulfur species.

For Case #1, 1,000 bbl/d of liquid benzene were fed at standard feed temperatures upstream of the first feed stream heat exchanger 104, providing for recycling 5,885 kg/hour of 92° C. benzene. For Case #1, the heating duty increased for the first feed stream heat exchanger 104, due to the additional amount of feed, but the heating duty of furnace 202 was decreased by 1.2% as compared to the base case, due to the exothermic reaction occurring via benzene hydrogenation in the sulfur removal system 108.

For Case #2, the 0.5 RR hot hydrogen/benzene accounted for recycling 8,196 kg/hour total hot (160° C.) gas (3,007 kg/hr benzene). For Case #2, the heating duty of the first feed stream heat exchanger 104 decreased to 133 MMBtu/hr, while the heating duty of furnace 202 was decreased by 1.6% as compared to the base case.

For Case #3, the 1.4 RR hot hydrogen/benzene accounted for recycling 23,427 kg/hour total hot (160° C.) gas (8,668 kg/hr benzene). For Case #3, all the recycled hydrogen comes from the effluent stream 305a recovered after the first recycle compressor (e.g., first compressor 304). For Case #3, the heating duty of the first feed stream heat exchanger 104 decreased to 128.6 MMBtu/hour, while the heating duty of furnace 202 was decreased by 4.7% as compared to the base case. The data indicate that if the heating duty of furnace 202 was a bottleneck, aromatizing the feed would allow for a greater amount of feed to be fed to the reforming section.

ADDITIONAL DESCRIPTION

A first aspect, which is a process for a catalytic reforming system, the process comprising: combining, upstream of a sulfur removal system in the catalytic reforming system, a first stream comprising an aromatic hydrocarbon with a second stream to form a combined stream comprising the aromatic hydrocarbon; and feeding the aromatic hydrocarbon to the sulfur removal system, wherein the aromatic hydrocarbon which is fed to the sulfur removal system is contained in or obtained from the combined stream.

A second aspect, which is the process of the first aspect, further comprising converting by exothermic reaction the aromatic hydrocarbon to an aliphatic hydrocarbon in the sulfur removal system.

A third aspect, which is the process of the second aspect, further comprising flowing a reduced sulfur stream comprising the aliphatic hydrocarbon generated in the sulfur removal system from the sulfur removal system to a second feed stream heat exchanger; heating the reduced sulfur stream in the second feed stream heat exchanger to form a catalytic reforming reactor feed stream comprising the aliphatic hydrocarbon; and feeding the catalytic reforming reactor feed stream to a first pair of a plurality of reactor-furnace pairs.

A fourth aspect, which is the process of any one of the first through the third aspects, wherein the second stream comprises a portion of an effluent stream flowing from a donor reactor of a plurality of reactor-furnace pairs connected in series in the catalytic reforming system.

A fifth aspect, which is the process of any one of the first through the fourth aspects, wherein the aromatic hydrocarbon which is fed to the sulfur removal system is obtained from the combined stream, wherein the first stream is an aromatic-containing stream; wherein the second stream is a hydrocarbon feed stream comprising a sulfur-containing compound, an aliphatic hydrocarbon, and water, wherein the combined stream is an aromatized hydrocarbon feed stream which is fed to a drier in the catalytic reforming system, and wherein the drier is in fluid communication with the sulfur removal system.

A sixth aspect, which is the process of any one of the first through the fourth aspects wherein the aromatic hydrocarbon which is fed to the sulfur removal system is obtained from the combined stream, wherein the first stream comprises at least a portion of an effluent stream flowing from a first compressor of a plurality of compressors in a recycle gas section of the catalytic reforming system, wherein the second stream is a recycle gas stream comprising hydrogen separated from liquid hydrocarbons in the recycle gas section of the catalytic reforming system, and wherein the combined stream is an aromatized recycle stream.

A seventh aspect, which is the process of the sixth aspect, further comprising combining the aromatized recycle stream with an inlet stream of a first feed stream heat exchanger of the catalytic reforming system, wherein the first feed stream heat exchanger is in fluid communication with the sulfur removal system.

An eighth aspect, which is the process of any one of the sixth and the seventh aspects, wherein a temperature of the first stream is higher than a temperature of the second stream.

A ninth aspect, which is the process of the eighth aspect, wherein a temperature of the first stream is from about 300° F. (about 149° C.) to about 400° F. (about 204° C.).

A tenth aspect, which is the process of any one of the sixth through the ninth aspects, wherein a temperature of the second stream is from about 41° F. (about 5° C.) to about 212° F. (about 100° C.).

A eleventh aspect, which is the process of any one of the first through the fourth aspects, wherein the aromatic hydrocarbon which is fed to the sulfur removal system is contained in the combined stream, wherein the first stream comprises at least a portion of an effluent stream flowing from a first compressor of a plurality of compressors in a recycle gas section of the catalytic reforming system, and wherein the second stream is a heated stream flowing from a first feed stream heat exchanger.

A twelfth aspect, which is the process of any one of the first through the eleventh aspects, further comprising flowing a first portion of an effluent stream from a donor reactor of a plurality of reactor-furnace pairs in the catalytic reforming system to a second feed stream heat exchanger of the catalytic reforming system; using the first portion to heat a reduced sulfur stream obtained from the sulfur removal system in the second feed stream heat exchanger; flowing a second portion of the effluent stream from the donor reactor of the plurality of reactor-furnace pairs to a first feed stream heat exchanger of the catalytic reforming system; and using the second portion to heat the aromatic hydrocarbon prior to feeding the aromatic hydrocarbon to the sulfur removal system.

A thirteenth aspect, which is a catalytic reforming system comprising a first stream comprising an aromatic hydrocarbon; a second stream; a combined stream formed by combining the first stream and the second stream, wherein the combined stream comprises the aromatic hydrocarbon; a sulfur removal system in fluid communication with the combined stream, wherein the sulfur removal system is configured to convert the aromatic hydrocarbon to an aliphatic hydrocarbon by exothermic reaction; a second feed stream heat exchanger in fluid communication with the sulfur removal system; and a plurality of reactor-furnace pairs connected in series, wherein a first pair of the plurality of reactor-furnace pairs is in fluid communication with the second feed stream heat exchanger.

A fourteenth aspect, which is the system of the thirteenth aspect, wherein the first stream comprises a portion of an effluent stream flowing from a donor reactor of the plurality of reactor-furnace pairs.

A fifteenth aspect, which is the system of the fourteenth aspect, wherein the donor reactor is a last reactor of the plurality of reactor-furnace pairs.

A sixteenth aspect, which is the system of any one of the thirteenth through the fifteenth aspects, further comprising a drier, wherein the combined stream is an aromatized hydrocarbon feed stream which is fed to the drier; a first feed stream heat exchanger in fluid communication with the drier and with the sulfur removal system; wherein the second stream is a hydrocarbon feed stream comprising a sulfur-containing compound, an aliphatic hydrocarbon, and water.

A seventeenth aspect, which is the system of any one of the thirteenth through the fifteenth aspects, further comprising a first feed stream heat exchanger in fluid communication with the sulfur removal system; and a recycle gas section comprising a plurality of compressors; wherein the first stream comprises at least a portion of an effluent stream of a first compressor of the plurality of compressors, and wherein the second stream is a recycle gas stream comprising hydrogen separated from liquid hydrocarbons in the recycle gas section of the catalytic reforming system.

An eighteenth aspect, which is the system of the seventeenth aspect, further comprising a dried hydrocarbon feed stream in fluid communication with the first feed stream heat exchanger, wherein the combined stream is an aromatized recycle stream which is in fluid communication with the dried hydrocarbon feed stream.

A nineteenth aspect, which is the system of any one of the seventeenth and the eighteenth aspects, wherein a temperature of the first stream is higher than a temperature of the second stream.

A twentieth aspect, which is the system of the nineteenth aspect, wherein a temperature of the first stream is from about 300° F. (about 149° C.) to about 400° F. (about 204° C.).

A twenty-first aspect, which is the system of any one of the seventeenth through the twentieth aspects, wherein a temperature of the second stream from about 41° F. (about 5° C.) to about 212° F. (about 100° C.).

A twenty-second aspect, which is the system of any one of the thirteenth through the fifteenth aspects, wherein the sulfur removal system is in fluid communication with the combined stream, the system further comprising a first feed stream heat exchanger in fluid communication with the sulfur removal system; and a recycle gas section comprising a plurality of compressors; wherein the first stream comprises at least a portion of an effluent stream flowing from a first compressor of the plurality of compressors, and wherein the second stream is a heated stream flowing from the first feed stream heat exchanger.

A twenty-third aspect, which is the system of any one of the thirteenth through the twenty-second aspects, further comprising an effluent stream of a donor reactor of the plurality of reactor-furnace pairs; and a first feed stream heat exchanger, wherein the effluent stream is in fluid communication with the second feed stream heat exchanger and with the first feed stream heat exchanger.

A twenty-fourth aspect, which is a process for a catalytic reforming system, the process comprising combining a hydrocarbon feed stream comprising a sulfur-containing compound, a first aliphatic hydrocarbon, and water with an aromatic-containing stream comprising an aromatic hydrocarbon to form an aromatized hydrocarbon feed stream comprising the sulfur-containing compound, the first aliphatic hydrocarbon, water, and the aromatic hydrocarbon; feeding the aromatized hydrocarbon feed stream to a drier to separate the water and form a dried hydrocarbon feed stream comprising the sulfur-containing compound, the first aliphatic hydrocarbon, and the aromatic hydrocarbon; heating the sulfur-containing compound, the first aliphatic hydrocarbon, and the aromatic hydrocarbon in a first feed stream heat exchanger to form a heated stream comprising the sulfur-containing compound, the first aliphatic hydrocarbon, and the aromatic hydrocarbon; feeding the heated stream to a sulfur removal system; converting the aromatic hydrocarbon to a second aliphatic hydrocarbon and removing the sulfur-containing compound in the sulfur removal system to form a reduced sulfur stream comprising the first aliphatic hydrocarbon and the second aliphatic hydrocarbon; feeding the reduced sulfur stream to a second feed stream heat exchanger; heating the first aliphatic hydrocarbon and the second aliphatic hydrocarbon in the second feed stream heat exchanger to form a catalytic reforming reactor feed stream comprising the first aliphatic hydrocarbon and the second aliphatic hydrocarbon; and feeding the catalytic reforming reactor feed stream to a first pair of a plurality of reactor-furnace pairs.

A twenty-fifth aspect, which is the process of the twenty-fourth aspect, wherein a temperature of the reduced sulfur stream is greater than a temperature of one or more of i) the heated stream, ii) the dried hydrocarbon feed stream, iii) the aromatized hydrocarbon feed stream, and iv) the hydrocarbon feed stream due to a heat of reaction generated in the step of converting.

A twenty-sixth aspect, which is a process for a catalytic reforming system, the process comprising combining an effluent stream of a first compressor of a plurality of compressors in a recycle gas section of the catalytic reforming system with a recycle gas stream comprising hydrogen separated from liquid hydrocarbons in the recycle gas section of the catalytic reforming system to form an aromatized recycle stream, wherein the effluent stream comprises an aromatic hydrocarbon, wherein the aromatized recycle stream comprises the aromatic hydrocarbon and hydrogen; combining the aromatized recycle stream with a dried hydrocarbon feed stream comprising a sulfur-containing compound and a first aliphatic hydrocarbon to form an aromatized hydrocarbon feed stream comprising the sulfur-containing compound, the first aliphatic hydrocarbon, the aromatic hydrocarbon, and hydrogen; feeding the aromatized hydrocarbon feed stream to a first feed stream heat exchanger; heating the sulfur-containing compound, the first aliphatic hydrocarbon, the aromatic hydrocarbon, and hydrogen in the first feed stream heat exchanger to form a heated stream comprising the sulfur-containing compound, the first aliphatic hydrocarbon, the aromatic hydrocarbon, and hydrogen; feeding the heated stream to a sulfur removal system; converting the aromatic hydrocarbon to a second aliphatic hydrocarbon and removing the sulfur-containing compound in the sulfur removal system to form a reduced sulfur stream comprising the first aliphatic hydrocarbon and the second aliphatic hydrocarbon; feeding the reduced sulfur stream to a second feed stream heat exchanger; heating the first aliphatic hydrocarbon and the second aliphatic hydrocarbon in the second feed stream heat exchanger to form a catalytic reforming reactor feed stream comprising the first aliphatic hydrocarbon and the second aliphatic hydrocarbon; and feeding the catalytic reforming reactor feed stream to a first pair of a plurality of reactor-furnace pairs.

A twenty-seventh aspect, which is the process of the twenty-sixth aspect, wherein a temperature of the reduced sulfur stream is greater than a temperature of one or more of i) the heated stream, ii) the dried hydrocarbon feed stream, and iii) the aromatized hydrocarbon feed stream, due to a heat of reaction generated in the step of converting.

A twenty-eighth aspect, which is the process of any one of the twenty-sixth and the twenty-seventh aspects, wherein a temperature of the reduced sulfur stream is greater than a temperature of one or more of i) the heated stream, ii) the dried hydrocarbon feed stream, and iii) the aromatized hydrocarbon feed stream due to the step of combining the aromatized recycle stream with the dried hydrocarbon feed stream.

A twenty-ninth aspect, which is a process for a catalytic reforming system, the process comprising recovering a heated stream comprising a sulfur-containing compound and a first aliphatic hydrocarbon from a first feed stream heat exchanger; combining an effluent stream of a first compressor of a plurality of compressors in a recycle gas section of the catalytic reforming system with the heated stream to form an aromatized hydrocarbon feed stream, wherein the effluent stream comprises an aromatic hydrocarbon, wherein the aromatized hydrocarbon feed stream comprises the sulfur-containing compound, the first aliphatic hydrocarbon, and the aromatic hydrocarbon; feeding the aromatized hydrocarbon feed stream to a sulfur removal system; converting the aromatic hydrocarbon to a second aliphatic hydrocarbon and removing the sulfur-containing compound in the sulfur removal system to form a reduced sulfur stream comprising the first aliphatic hydrocarbon and the second aliphatic hydrocarbon; feeding the reduced sulfur stream to a second feed stream heat exchanger; heating the first aliphatic hydrocarbon and the second aliphatic hydrocarbon in the second feed stream heat exchanger to form a catalytic reforming reactor feed stream comprising the first aliphatic hydrocarbon and the second aliphatic hydrocarbon; and feeding the catalytic reforming reactor feed stream to a first pair of a plurality of reactor-furnace pairs.

A thirtieth aspect, which is the process of the twenty-ninth aspect, wherein a temperature of the reduced sulfur stream is greater than a temperature of one or more of i) the heated stream and ii) the aromatized hydrocarbon feed stream, due to a heat of reaction generated in the step of converting.

A thirty-first aspect, which is a process for a catalytic reforming system, the process comprising controlling an amount of aromatic hydrocarbon fed to a sulfur removal system in the catalytic reforming system such that a temperature of a reduced sulfur stream flowing from the sulfur removal system is higher than a temperature of a stream which is fed to the sulfur removal system, due to a heat of reaction generated in the sulfur removal system by converting at least a portion of the aromatic hydrocarbon to an aliphatic hydrocarbon.

A thirty-second aspect, which is the process of the thirty-first aspect, wherein the sulfur removal system operates at a temperature of about 500° F. (260° C.) to about 600° F. (316° C.).

A thirty-third aspect, which is a process for a catalytic reforming system, the process comprising feeding an effective amount of aromatic hydrocarbons to a sulfur removal system of the catalytic reforming system such that a heat duty of a first furnace of a plurality of reactor-furnace pairs connected in series in the catalytic reforming system is reduced relative to operation of the sulfur removal system without the effective amount of aromatic hydrocarbons.

A thirty-fourth aspect, which is the process of the thirty-third aspect, wherein the effective amount of aromatic hydrocarbons is provided by a concentration of less than about 10 wt. % supplemental aromatic hydrocarbons based on a total weight in a stream containing the aromatic hydrocarbons which is fed to the sulfur removal system.

A thirty-fifth aspect, which is a process for a catalytic reforming system, the process comprising feeding aromatics at a first temperature to a sulfur removal system located upstream of a plurality of reactor-furnace pairs; converting at least a portion of the aromatics to non-aromatics via exothermic reaction in the sulfur removal system; recovering an effluent from the sulfur removal system having a second temperature that is greater than the first temperature due to the exothermic reaction in the step of converting.

A thirty-sixth aspect, which is the process of the thirty-fifth aspect, wherein the sulfur removal system operates at a temperature of about 500° F. (260° C.) to about 600° F. (316° C.).

A thirty-seventh aspect, which is the process of any one of the thirty-fifth and the thirty-sixth aspects, further comprising flowing the effluent through a feed stream heat exchanger and then to a first furnace of a plurality of reactor-furnace pairs connected in series in the catalytic reforming system.

A thirty-eighth aspect, which is the process of the thirty-seventh aspect, wherein a heat duty of the first furnace is reduced compared to operation of the sulfur removal system without the steps of feeding and converting.

A thirty-ninth aspect, which is the process of any one of the thirty-fifth through the thirty-eighth aspects, wherein a heat duty of the first furnace is reduced by equal to or greater than about 0.5% when compared to operation of the sulfur removal system without the steps of feeding and converting.

A fortieth aspect, which is the process of any one of the twenty-ninth and thirtieth aspects, wherein the sulfur removal system operates at a temperature of about 500° F. (260° C.) to about 600° F. (316° C.).

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system, or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A process for a catalytic reforming system, the process comprising:
combining, upstream of a sulfur removal system in the catalytic reforming system, a first stream comprising an aromatic hydrocarbon with a second stream to form a combined stream comprising the aromatic hydrocarbon; and
feeding the aromatic hydrocarbon to the sulfur removal system, wherein the aromatic hydrocarbon which is fed to the sulfur removal system is contained in or obtained from the combined stream,
wherein the second stream comprises a portion of an effluent stream flowing from a donor reactor of a plurality of reforming reactor-furnace pairs connected in series in the catalytic reforming system and wherein the donor reactor is a catalytic reforming reactor.

2. A process for a catalytic reforming system, the process comprising:
combining, upstream of a sulfur removal system in the catalytic reforming system, a first stream comprising an aromatic hydrocarbon with a second stream to form a combined stream comprising the aromatic hydrocarbon; and
feeding the aromatic hydrocarbon to the sulfur removal system, wherein the aromatic hydrocarbon which is fed to the sulfur removal system is contained in or obtained from the combined stream,
wherein the aromatic hydrocarbon which is fed to the sulfur removal system is obtained from the combined stream,
wherein the first stream is an aromatic-containing stream;
wherein the second stream is a hydrocarbon feed stream comprising a sulfur-containing compound, an aliphatic hydrocarbon, and water,
wherein the combined stream is an aromatized hydrocarbon feed stream which is fed to a drier in the catalytic reforming system, and
wherein the drier is in fluid communication with the sulfur removal system.

3. A process for a catalytic reforming system, the process comprising:
combining, upstream of a sulfur removal system in the catalytic reforming system, a first stream comprising an aromatic hydrocarbon with a second stream to form a combined stream comprising the aromatic hydrocarbon; and
feeding the aromatic hydrocarbon to the sulfur removal system, wherein the aromatic hydrocarbon which is fed to the sulfur removal system is contained in or obtained from the combined stream,
wherein the aromatic hydrocarbon which is fed to the sulfur removal system is obtained from the combined stream,
wherein the first stream comprises at least a portion of an effluent stream flowing from a first compressor of a plurality of compressors in a recycle gas section of the catalytic reforming system,
wherein the second stream is a recycle gas stream comprising hydrogen separated from liquid hydrocarbons in the recycle gas section of the catalytic reforming system, and
wherein the combined stream is an aromatized recycle stream.

4. The process of claim 3, further comprising:
combining the aromatized recycle stream with an inlet stream of a first feed stream heat exchanger of the catalytic reforming system,
wherein the first feed stream heat exchanger is in fluid communication with the sulfur removal system.

5. The process of claim 3, wherein a temperature of the first stream is higher than a temperature of the second stream.

6. The process of claim 5, wherein a temperature of the first stream is from about 300° F. (about 149° C.) to about 400° F. (about 204° C.).

7. The process of claim 5, wherein a temperature of the second stream is from about 41° F. (about 5° C.) to about 212° F. (about 100° C.).

8. A process for a catalytic reforming system, the process comprising:
combining, upstream of a sulfur removal system in the catalytic reforming system, a first stream comprising an aromatic hydrocarbon with a second stream to form a combined stream comprising the aromatic hydrocarbon; and
feeding the aromatic hydrocarbon to the sulfur removal system, wherein the aromatic hydrocarbon which is fed to the sulfur removal system is contained in or obtained from the combined stream,
wherein the aromatic hydrocarbon which is fed to the sulfur removal system is contained in the combined stream,
wherein the first stream comprises at least a portion of an effluent stream flowing from a first compressor of a plurality of compressors in a recycle gas section of the catalytic reforming system, and
wherein the second stream is a heated stream flowing from a first feed stream heat exchanger.

9. A process for a catalytic reforming system, the process comprising:
combining, upstream of a sulfur removal system in the catalytic reforming system, a first stream comprising an aromatic hydrocarbon with a second stream to form a combined stream comprising the aromatic hydrocarbon; and
feeding the aromatic hydrocarbon to the sulfur removal system, wherein the aromatic hydrocarbon which is fed to the sulfur removal system is contained in or obtained from the combined stream, further comprising:
flowing a first portion of an effluent stream from a donor reactor of a plurality of reforming reactor-furnace pairs in the catalytic reforming system to a second feed stream heat exchanger of the catalytic reforming system, wherein the donor reactor is a catalytic reforming reactor;
using the first portion to heat a reduced sulfur stream obtained from the sulfur removal system in the second feed stream heat exchanger;
flowing a second portion of the effluent stream from the donor reactor of the plurality of reactor-furnace pairs to a first feed stream heat exchanger of the catalytic reforming system; and using the second portion to heat the aromatic hydrocarbon prior to feeding the aromatic hydrocarbon to the sulfur removal system.

10. A process for a catalytic reforming system, the process comprising:
    combining a hydrocarbon feed stream comprising a sulfur-containing compound, a first aliphatic hydrocarbon, and water with an aromatic-containing stream comprising an aromatic hydrocarbon to form an aromatized hydrocarbon feed stream comprising the sulfur-containing compound, the first aliphatic hydrocarbon, water, and the aromatic hydrocarbon;
    feeding the aromatized hydrocarbon feed stream to a drier to separate the water and form a dried hydrocarbon feed stream comprising the sulfur-containing compound, the first aliphatic hydrocarbon, and the aromatic hydrocarbon;
    heating the sulfur-containing compound, the first aliphatic hydrocarbon, and the aromatic hydrocarbon in a first feed stream heat exchanger to form a heated stream comprising the sulfur-containing compound, the first aliphatic hydrocarbon, and the aromatic hydrocarbon;
    feeding the heated stream to a sulfur removal system;
    converting the aromatic hydrocarbon to a second aliphatic hydrocarbon and removing the sulfur-containing compound in the sulfur removal system to form a reduced sulfur stream comprising the first aliphatic hydrocarbon and the second aliphatic hydrocarbon;
    feeding the reduced sulfur stream to a second feed stream heat exchanger;
    heating the first aliphatic hydrocarbon and the second aliphatic hydrocarbon in the second feed stream heat exchanger to form a catalytic reforming reactor feed stream comprising the first aliphatic hydrocarbon and the second aliphatic hydrocarbon; and
    feeding the catalytic reforming reactor feed stream to a first pair of a plurality of reactor-furnace pairs.

11. The process of claim 10, wherein a temperature of the reduced sulfur stream is greater than a temperature of one or more of i) the heated stream, ii) the dried hydrocarbon feed stream, iii) the aromatized hydrocarbon feed stream, and iv) the hydrocarbon feed stream due to a heat of reaction generated in the step of converting.

12. A process for a catalytic reforming system, the process comprising:
    combining an effluent stream of a first compressor of a plurality of compressors in a recycle gas section of the catalytic reforming system with a recycle gas stream comprising hydrogen separated from liquid hydrocarbons in the recycle gas section of the catalytic reforming system to form an aromatized recycle stream, wherein the effluent stream comprises an aromatic hydrocarbon, wherein the aromatized recycle stream comprises the aromatic hydrocarbon and hydrogen;
    combining the aromatized recycle stream with a dried hydrocarbon feed stream comprising a sulfur-containing compound and a first aliphatic hydrocarbon to form an aromatized hydrocarbon feed stream comprising the sulfur-containing compound, the first aliphatic hydrocarbon, the aromatic hydrocarbon, and hydrogen;
    feeding the aromatized hydrocarbon feed stream to a first feed stream heat exchanger; heating the sulfur-containing compound, the first aliphatic hydrocarbon, the aromatic hydrocarbon, and hydrogen in the first feed stream heat exchanger to form a heated stream comprising the sulfur-containing compound, the first aliphatic hydrocarbon, the aromatic hydrocarbon, and hydrogen;
    feeding the heated stream to a sulfur removal system;
    converting the aromatic hydrocarbon to a second aliphatic hydrocarbon and removing the sulfur-containing compound in the sulfur removal system to form a reduced sulfur stream comprising the first aliphatic hydrocarbon and the second aliphatic hydrocarbon;
    feeding the reduced sulfur stream to a second feed stream heat exchanger;
    heating the first aliphatic hydrocarbon and the second aliphatic hydrocarbon in the second feed stream heat exchanger to form a catalytic reforming reactor feed stream comprising the first aliphatic hydrocarbon and the second aliphatic hydrocarbon; and
    feeding the catalytic reforming reactor feed stream to a first pair of a plurality of reactor-furnace pairs.

13. The process of claim 12, wherein a temperature of the reduced sulfur stream is greater than a temperature of one or more of i) the heated stream, ii) the dried hydrocarbon feed stream, and iii) the aromatized hydrocarbon feed stream, due to a heat of reaction generated in the step of converting.

14. The process of claim 12, wherein a temperature of the reduced sulfur stream is greater than a temperature of one or more of i) the heated stream, ii) the dried hydrocarbon feed stream, and iii) the aromatized hydrocarbon feed stream due to the step of combining the aromatized recycle stream with the dried hydrocarbon feed stream.

15. A process for a catalytic reforming system, the process comprising:
    recovering a heated stream comprising a sulfur-containing compound and a first aliphatic hydrocarbon from a first feed stream heat exchanger;
    combining an effluent stream of a first compressor of a plurality of compressors in a recycle gas section of the catalytic reforming system with the heated stream to form an aromatized hydrocarbon feed stream, wherein the effluent stream comprises an aromatic hydrocarbon, wherein the aromatized hydrocarbon feed stream comprises the sulfur-containing compound, the first aliphatic hydrocarbon, and the aromatic hydrocarbon;
    feeding the aromatized hydrocarbon feed stream to a sulfur removal system;
    converting the aromatic hydrocarbon to a second aliphatic hydrocarbon and removing the sulfur-containing compound in the sulfur removal system to form a reduced sulfur stream comprising the first aliphatic hydrocarbon and the second aliphatic hydrocarbon;
    feeding the reduced sulfur stream to a second feed stream heat exchanger;
    heating the first aliphatic hydrocarbon and the second aliphatic hydrocarbon in the second feed stream heat exchanger to form a catalytic reforming reactor feed stream comprising the first aliphatic hydrocarbon and the second aliphatic hydrocarbon; and
    feeding the catalytic reforming reactor feed stream to a first pair of a plurality of reactor-furnace pairs.

16. The process of claim 15, wherein a temperature of the reduced sulfur stream is greater than a temperature of one or more of i) the heated stream and ii) the aromatized hydrocarbon feed stream, due to a heat of reaction generated in the step of converting.

17. The process of claim 15, wherein the sulfur removal system operates at a temperature of about 500° F. (260° C.) to about 600° F. (316° C.).

* * * * *